US012561976B2

(12) United States Patent
Homma

(10) Patent No.: US 12,561,976 B2
(45) Date of Patent: Feb. 24, 2026

(54) COMMENT GENERATION DEVICE AND COMMENT GENERATION METHOD

(71) Applicant: SONY GROUP CORPORATION, Tokyo (JP)

(72) Inventor: Fuminori Homma, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/709,093

(22) PCT Filed: Oct. 20, 2022

(86) PCT No.: PCT/JP2022/039071
§ 371 (c)(1),
(2) Date: May 10, 2024

(87) PCT Pub. No.: WO2023/090040
PCT Pub. Date: May 25, 2023

(65) Prior Publication Data
US 2025/0029380 A1 Jan. 23, 2025

(30) Foreign Application Priority Data
Nov. 18, 2021 (JP) ................................. 2021-188077

(51) Int. Cl.
*G06V 20/40* (2022.01)
*G06T 7/20* (2017.01)
*G06V 10/764* (2022.01)

(52) U.S. Cl.
CPC ................ *G06V 20/42* (2022.01); *G06T 7/20* (2013.01); *G06V 10/764* (2022.01)

(58) Field of Classification Search
None
See application file for complete search history.

(56) References Cited

U.S. PATENT DOCUMENTS

| | | | |
|---|---|---|---|
| 2017/0064348 A1 | 3/2017 | Bynoe et al. | |
| 2022/0159319 A1* | 5/2022 | Wang ................. | H04N 21/2187 |
| 2022/0284628 A1* | 9/2022 | Tuxen .................... | H04N 23/69 |

FOREIGN PATENT DOCUMENTS

| | | |
|---|---|---|
| JP | 2005-165941 A | 6/2005 |
| JP | 2020-096660 A | 6/2020 |

OTHER PUBLICATIONS

International Search Report and Written Opinion of PCT Application No. PCT/JP2022/039071, issued on Jan. 17, 2023, 10 pages of ISRWO.

(Continued)

*Primary Examiner* — James M Anderson, II
(74) *Attorney, Agent, or Firm* — CHIP LAW GROUP

(57) ABSTRACT

Provided is a comment generation device that includes a history meta information acquisition unit and a live determination unit. The history meta information acquisition unit analyzes target video data and acquires history meta information associated with a target event recorded in the target video data. The live determination unit acquires target live classification meta information on the basis of the history meta information and determines a target live commentary corresponding to the target live classification meta information. The history meta information includes past event meta information and live classification meta information associated with an event state before a time point at which the target live commentary is associated in the target event. The event meta information is meta information related to the state of the target event, and the live classification meta information is meta information related to the classification of the live commentary.

19 Claims, 30 Drawing Sheets

(56)     References Cited

OTHER PUBLICATIONS

Fukino, et al., "Generating Football Video Summery Using News Article", Proceedings of the 14th Data Engineering Workshop, Aug. 18, 2009, pp. 1-7.

Ishigaki, et al., "Racing Game Commentary Generation", IPSJ SIG Technical Report, Sep. 22, 2021, vol. 8, No. 2021-NL-250, p. 1-11.

Kameko, et al., "Automatic Generation of Commentary for Shogi Game Records", Journal of Japanese Society for Artificial Intelligence, Jul. 1, 2019, vol. 34, No. 4, p. 475-482.

* cited by examiner

ANALYSIS UNIT 23 d3 TARGET VIDEO DATA

Figure 18:
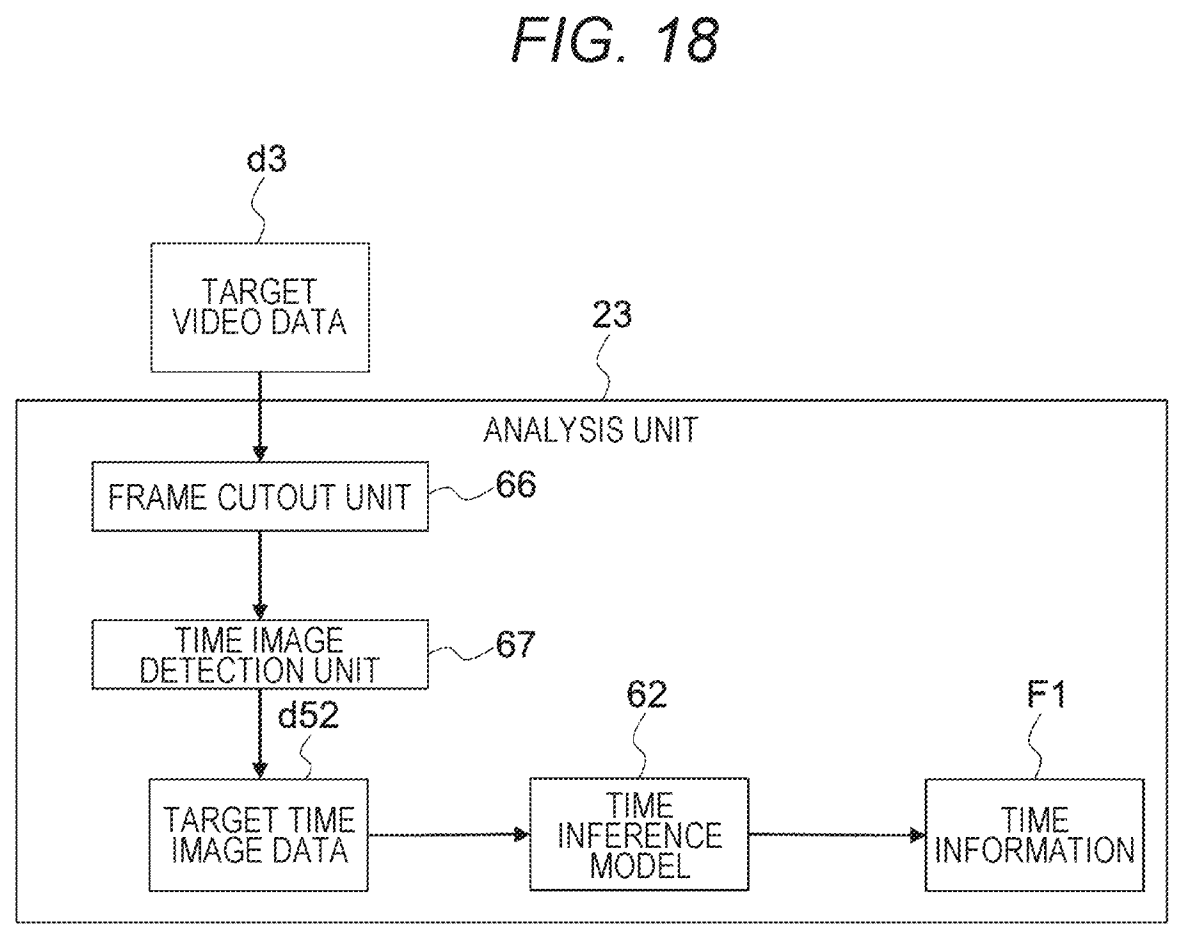

66 FRAME CUTOUT UNIT

67 TIME IMAGE DETECTION UNIT d52 TARGET TIME IMAGE DATA

62 TIME INFERENCE MODEL

F1 TIME INFORMATION d3 d40 d3 d24 d3 d34

COMMENT GENERATION DEVICE AND COMMENT GENERATION METHOD

CROSS REFERENCE TO RELATED APPLICATIONS

This application is a U.S. National Phase of International Patent Application No. PCT/JP2022/039071 filed on Oct. 20, 2022, which claims priority benefit of Japanese Patent Application No. JP 2021-188077 filed in the Japan Patent Office on Nov. 18, 2021. Each of the above-referenced applications is hereby incorporated herein by reference in its entirety.

TECHNICAL FIELD

The present disclosure relates to a comment generation device, a comment generation method, and a program.

BACKGROUND ART

A device that automatically generates a comment according to an event state in a video recording an event such as a sports game has been known.

For example, Patent Document 1 discloses a device intended to generate a comment corresponding to the content of an extracted event.

CITATION LIST

Patent Document

Patent Document 1: Japanese Patent Application Laid-Open No. 2005-165941

SUMMARY OF THE INVENTION

Problems to Be Solved by the Invention

In a conventionally proposed comment generation device, a comment is generated according to a predetermined fixed rule, or a comment is added to a video at a predetermined timing. Therefore, the content of the generated comment and the comment addition timing tend to be monotonous.

Such a monotonous comment conforming to a predetermined rule tends to give boredom to a user who views an event video, and a viewing satisfaction of the user is not necessarily sufficiently satisfied.

The present disclosure provides a technique advantageous for providing a live commentary corresponding to a state of an event recorded in video data together with a video at an adaptive timing.

Solutions to Problems

An aspect of the present disclosure relates to a comment generation device including: a history meta information acquisition unit configured to analyze target video data and acquire history meta information associated with a target event recorded in the target video data; and a live determination unit configured to acquire target live classification meta information on a basis of the history meta information, and determine a target live commentary corresponding to the target live classification meta information; in which the history meta information includes past event meta information and live classification meta information associated with an event state before a time point with which the target live commentary is associated in the target event, and the event meta information is meta information associated with a state of the target event, and the live classification meta information is meta information associated with classification of the live commentary.

The live determination unit may acquire the target live classification meta information by inputting the history meta information associated with the target event to a learned live issuance model learned to output a live classification meta information on a basis of the history meta information.

The learned live issuance model may be obtained on a basis of learning live classification meta information corresponding to a learning target live commentary included in the learning event recorded in the learning video data; and the live classification meta information acquired by inputting, to a live issuance model, learning history meta information associated with an event state before a time point at which the learning target live commentary is associated in the learning event.

The comment generation device may include a live classification unit configured to analyze learning video data to acquire learning live classification meta information corresponding to a learning target live commentary included in a learning event recorded in the learning video data; and a learning unit configured to learn the live issuance model on a basis of the learning live classification meta information used as teacher data and the live classification meta information acquired by inputting, to the live issuance model, learning history meta information associated with an event state before a time point at which the learning target live commentary is associated in the learning event.

The live determination unit may determine the target live commentary on a basis of live template data selected from among a plurality of pieces of live template data stored in a repository unit in accordance with the target live classification meta information.

The plurality of pieces of live template data may be acquired by inputting the event meta information to a learned live generation model learned to output a plurality of pieces of live template data on a basis of the event meta information.

The comment generation device may include a learning unit that performs learning of the live generation model by using, as teacher data, learning live template data extracted from information disclosed on a network according to the event meta information.

The event meta information may include information related to a person.

The information associated with the person may include situation meta information estimated on a basis of motion information indicating a motion of the person obtained by analyzing the target video data.

The situation meta information may include at least one of scene information indicating a scene content of an event and play information indicating a play content of the event.

The motion information may be based on information on a body part of the person obtained by analyzing the target video data.

The motion information may be based on information on a moving position of the person obtained by analyzing the target video data.

The information associated with the person may include information for identifying the person derived from at least one of an image of appearance of the person and an image of attachment of the person.

The event meta information may include information not associated with the person.

The target event may be a sports game, and the event meta information may include at least one of scene information regarding a scene content of the game, play information regarding a play content of the game, person identification information regarding a participant of the game, score information regarding a score of the game, and time information regarding a time of the game.

The genre of the learning event may be different from the genre of the target event.

One of the target video data and the learning video data may be live-action video data, and the other may be generated video data.

Another aspect of the present disclosure relates to a comment generation method including the steps of: analyzing target video data and acquiring history meta information associated with a target event recorded in the target video data; and acquiring target live classification meta information on a basis of the history meta information, and determining a target live commentary corresponding to the target live classification meta information; in which the history meta information includes past event meta information and live classification meta information associated with an event state before a time point with which the target live commentary is associated in the target event, and the event meta information is meta information associated with a state of the target event, and the live classification meta information is meta information associated with classification of the live commentary.

Another aspect of the present disclosure relates to a program for causing a computer to implement: analyzing target video data and acquiring history meta information associated with a target event recorded in the target video data; and acquiring target live classification meta information on a basis of the history meta information, and determining a target live commentary corresponding to the target live classification meta information; in which the history meta information includes past event meta information and live classification meta information associated with an event state before a time point with which the target live commentary is associated in the target event, and the event meta information is meta information associated with a state of the target event, and the live classification meta information is meta information associated with classification of the live commentary.

BRIEF DESCRIPTION OF DRAWINGS

FIG. 1 is a diagram illustrating a typical example of a hardware configuration of a comment generation device.

FIG. 10 is a block diagram illustrating an example of a functional configuration related to learning processing of a face inference model.

FIG. 12 is a block diagram illustrating a functional configuration related to another example of human identification information inference processing using a face inference model.

FIG. 13 is a block diagram illustrating an example of a functional configuration related to learning processing of a uniform number inference model.

FIG. 14 is a block diagram illustrating an example of a functional configuration related to acquisition processing (inference processing) of uniform number information using a uniform number inference model.

FIG. 15 is a block diagram illustrating an example of a functional configuration related to learning processing of a score inference model.

FIG. 16 is a block diagram illustrating an example of a functional configuration related to learning processing of a time inference model.

FIG. 17 is a block diagram illustrating an example of a functional configuration related to acquisition processing (inference processing) of score information using a score inference model.

FIG. 18 is a block diagram illustrating an example of a functional configuration related to acquisition processing (inference processing) of time information using a time inference model.

FIG. 23 is a block diagram illustrating an example of a functional configuration related to learning processing of a live generation model.

FIG. 29 is a block diagram illustrating an example of a functional configuration related to determination processing of a target live commentary (determination live data) using a live issuance model.

MODE FOR CARRYING OUT THE INVENTION

Figure 2:
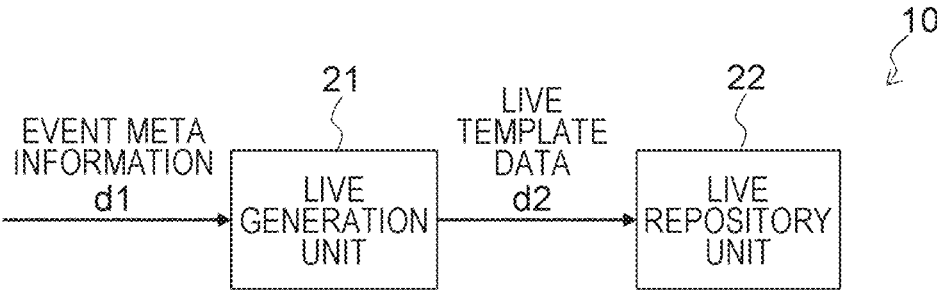
FIG. 2 is a block diagram illustrating an example of a functional configuration related to generation of live template data.

Hereinafter, a typical embodiment of the present disclosure will be exemplarily described with reference to the drawings.

Figure 1:
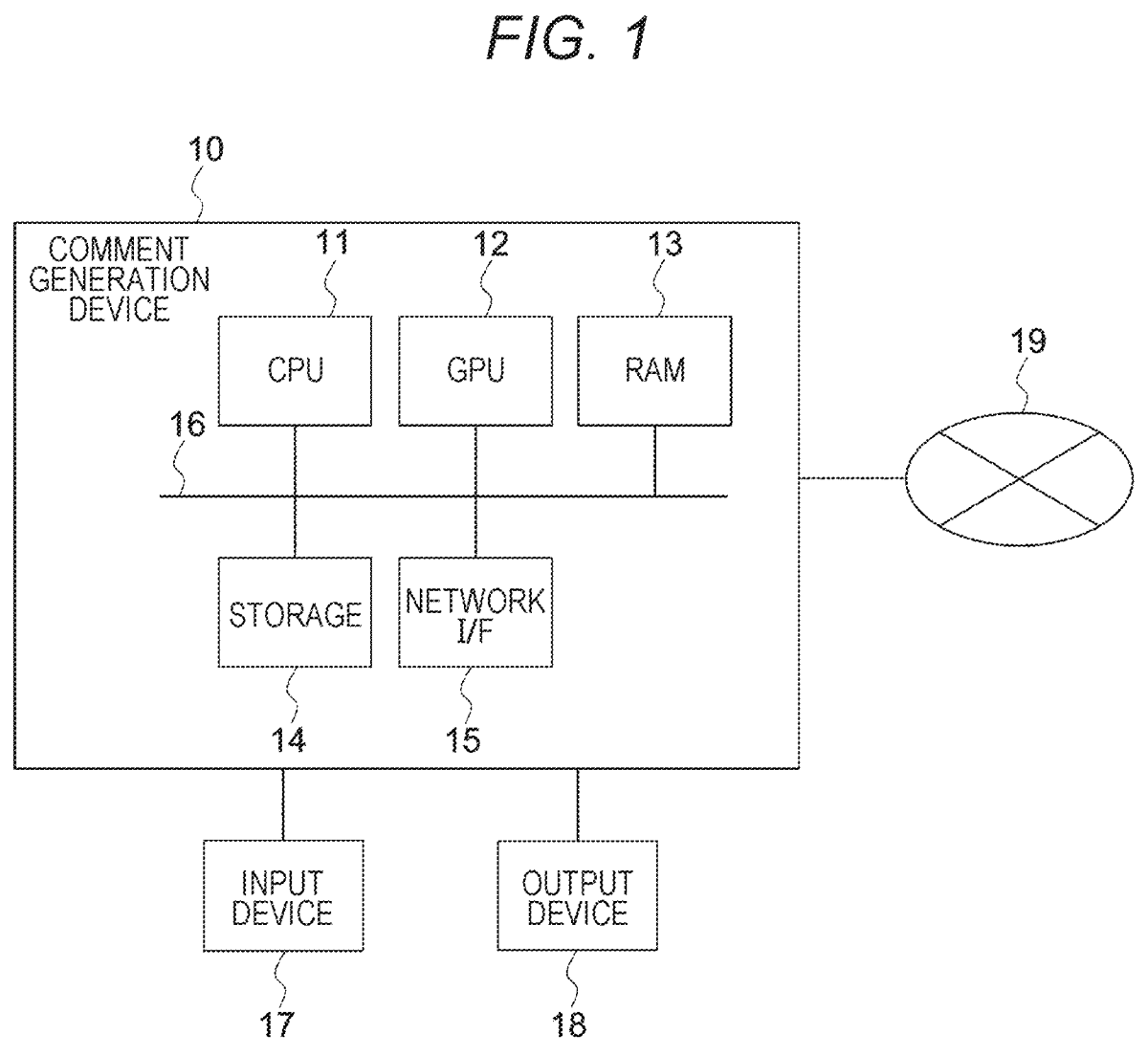

FIG. 1 is a diagram illustrating a typical example of a hardware configuration of the comment generation device 10.

The comment generation device 10 includes a central processing unit (CPU) 11, a graphics processing unit (GPU) 12, a random access memory (RAM) 13, a storage 14, and a network interface (I/F) 15. These devices included in the comment generation device 10 are mutually connected through a bus 16, and can mutually transmit and receive data through the bus 16.

The comment generation device 10 is connected with an input device 17 (for example, a keyboard and a mouse), an output device 18 (for example, a display), and a network 19 (for example, the Internet).

The user can perform data input to the comment generation device 10 through the input device 17, and can confirm data output (for example, video and live commentary) from the comment generation device 10 through the output device 18 through visual, auditory, and other senses. Furthermore, the comment generation device 10 transmits and receives data to and from various servers, communication terminals, and other external devices connected to the network 19 as necessary, to collect information from the external devices and provide the information to the external devices.

As will be described later, the comment generation device 10 determines a live commentary to be added to a video of an event recorded in the video data at an adaptive timing according to the event state.

The "event" referred to herein may refer to an overall event that can be recorded as a video and can be provided together with a live commentary. Typically, an event or entertainment whose situation may change over time may correspond to an "event".

Hereinafter, a case where the event recorded in the video data is a sports game will be mainly described. However, the technology described below can be appropriately applied to a case where video data records another event.

Figure 3:
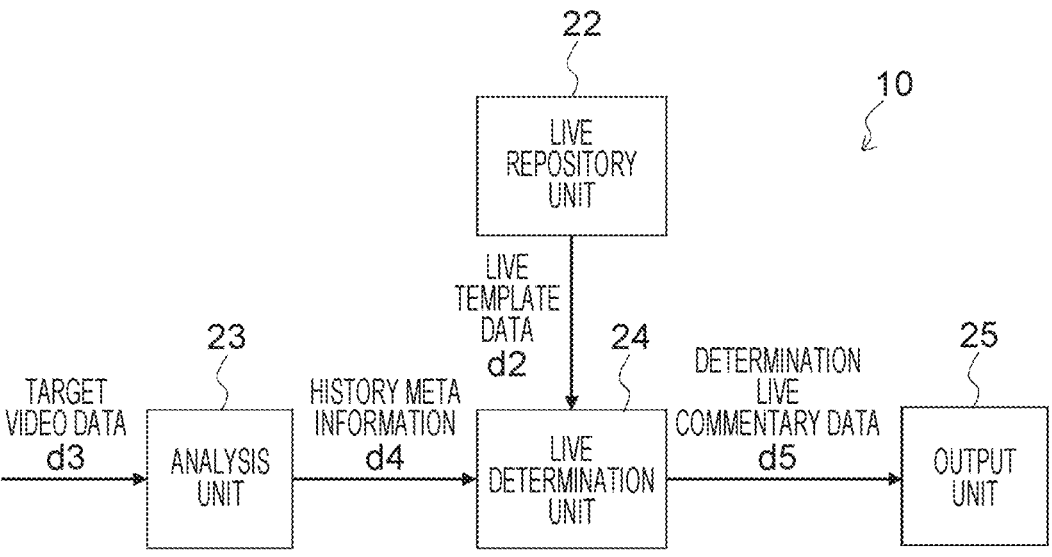
FIG. 3 is a block diagram illustrating an example of a functional configuration of a comment generation device related to determination of determination live commentary data.
Figure 4:
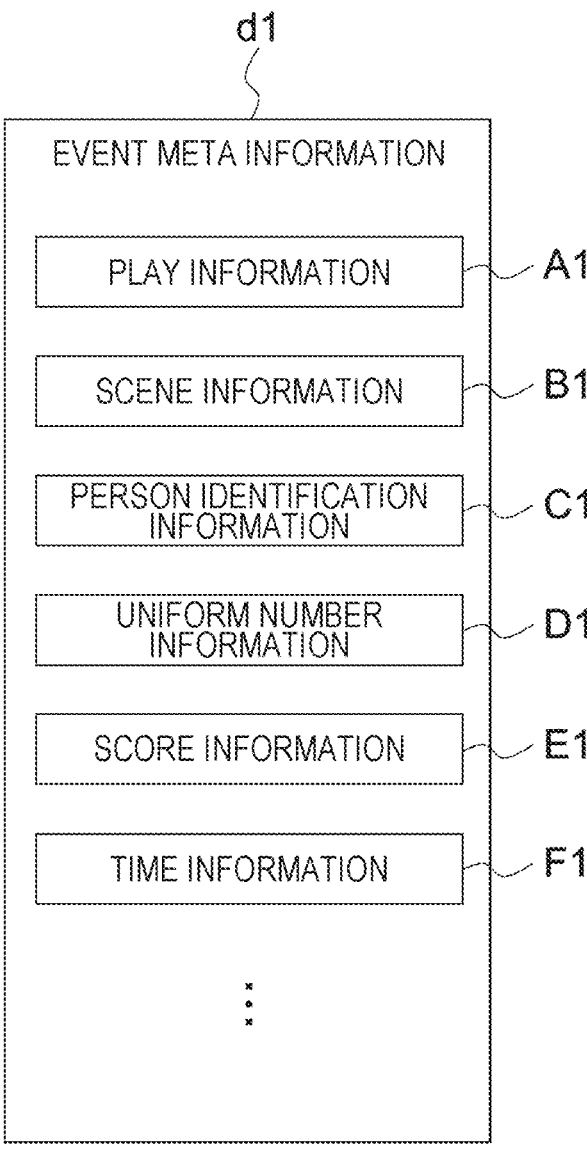
FIG. 4 is a block diagram illustrating an example of a concept of event meta information.

FIG. 2 is a block diagram illustrating an example of a functional configuration related to generation of a live template data d2. FIG. 3 is a block diagram illustrating an example of a functional configuration of the comment generation device 10 related to determination of the determination live commentary data d5. FIG. 4 is a block diagram illustrating an example of a concept of event meta information d1.

Each functional block illustrated in FIGS. 2 to 4 and each drawing described later can be appropriately configured by arbitrary hardware and/or software.

As illustrated in FIG. 2, the comment generation device 10 includes a live generation unit 21 and a live repository unit 22.

The live generation unit 21 receives event meta information d1 and outputs live template data d2 corresponding to the input event meta information d1.

The live template data d2 is template data based on a comment content related to the event meta information d1, and configures basic data of the live commentary (live sentence) added to the video.

The live template data d2 output from the live generation unit 21 is stored and held in the live repository unit 22 (for example, the storage 14 illustrated in FIG. 1). A live template data d2 stored in the live repository unit 22 is read and used as necessary by another device.

As illustrated in FIG. 3, the comment generation device 10 further includes an analysis unit 23, a live determination unit 24, and an output unit 25.

The analysis unit 23 analyzes an input target video data d3, and acquires and outputs history meta information d4 associated with an event (target event) such as a sports game recorded in the target video data d3.

The target video data d3 may be real-time video data or stored video data. That is, the target video data d3 output from the imaging device (not illustrated) that is imaging the target event may be directly input to the analysis unit 23, or the target video data d3 may be input from the storage unit (for example, the storage 14 in FIG. 1) to the analysis unit 23 after the end of the target event.

The history meta information d4 includes the past event meta information d1 and the live classification meta information associated with the event state before the time point with which the target live commentary is associated in the target event. The event meta information d1 is meta information related to a state of the target event (see FIG. 4). The live classification meta information is meta information related to the classification of the live commentary according to the comment content (see FIG. 27 to be described later). As described above, in order to obtain the target live commentary, the history meta information d4 including the past meta information (the event meta information d1 and the live classification meta information) based on the target live commentary is used. The history meta information d4 will be described later.

The live determination unit 24 determines and outputs the determination live commentary data d5 on the basis of the history meta information d4 from the analysis unit 23 and the live template data d2 from the live repository unit 22. The determination live commentary data d5 determined in this manner indicates the live commentary considered to be optimal as the target live commentary.

The output unit 25 performs output processing using the determination live commentary data d5 output from the live determination unit 24. As a result, the live commentary indicated by the determination live commentary data d5 is output together with the video based on the target video data d3 through the output device 18 (see FIG. 1) such as a display and presented to the user.

The output unit 25 can acquire the target video data d3 by an arbitrary method. The target video data d3 may be provided to the output unit 25 together with the determination live commentary data d5, or may be provided to the output unit 25 separately from the determination live commentary data d5.

Note that the functional configuration of the comment generation device 10 is not limited to the example illustrated in FIGS. 2 and 3 described above. For example, some of the functional blocks illustrated in FIGS. 2 and 3 (for example, the live generation unit 21 and/or the live repository unit 22) may be realized by an external device other than the comment generation device 10. As an example, in a case where the live repository unit 22 is configured by an external device, data may be transmitted and received between the comment generation device 10 (for example, the live determination unit 24) and the live repository unit 22 through communication using the network 19 (see FIG. 1).

The event meta information d1 described above may include various types of information determined according to the target event recorded in the target video data d3. In a case where the target event recorded in the target video data d3 is a sports game, the event meta information d1 may typically include various types of information illustrated in FIG. 4. That is, play information A1, scene information B1, person identification information C1, uniform number information D1, score information E1, and time information F1 can be included in the event meta information d1.

The play information A1 is the event meta information d1 regarding the play content of the game. For example, in the case of a rugby game, the action (for example, a kick or a pass) of each player is classified into the play information A1.

The scene information B1 is event meta information d1 related to a scene content of the game. For example, in the case of a rugby game, a line-out scene or a scrum scene is classified into the scene information B1.

The person identification information C1 is event meta information d1 related to the identification of participants of the game. For example, in the case of a rugby game, faces of a player, a referee, a director, and an audience are classified into the person identification information C1.

The uniform number information D1 is the event meta information d1 indicating the identification number assigned to the participant (typically, the player). For example, in the case of a rugby game, a uniform number displayed on a uniform (for example, an outerwear) of a player is classified into the uniform number information D1.

The score information E1 is event meta information d1 indicating the score of the game.

The time information F1 is event meta information d1 indicating time information of a game (for example, an elapsed time or a remaining time of the game).

Note that the information that can be included in the event meta information d1 is not limited to the play information A1 to the time information F1 described above, and other information may be included in the event meta information d1. For example, in a case where the event is a ball game, ball information (for example, position information) may be included in the event meta information d1. Furthermore, in a case where the target event recorded in the target video data d3 is not a sports game, the event meta information d1 may not include one or more of the play information A1 to the time information F1 described above.

Next, a method of obtaining the event meta information d1 from the target video data d3 will be exemplified.

Hereinafter, an example of a method of acquiring the play information A1, the scene information B1, the person identification information C1, the uniform number information D1, the score information E1, and the time information F1 mainly based on an artificial intelligence (AI) technology will be described.

The AI technology mentioned here is a concept that can include a so-called machine learning technology and a deep learning technology, and any one of "supervised learning", "unsupervised learning", "reinforcement learning", and other learning methods may be adopted. The AI technology available for acquiring the event meta information d1 is not limited, and the event meta information d1 can be derived based on an arbitrary algorithm.

Therefore, the method described below is merely an example, and the event meta information d1 may be acquired by a device that implements another AI technology (for example, unsupervised learning), or the event meta information d1 may be acquired by a device using a technology other than the AI technology.

Play Information

Figure 5:
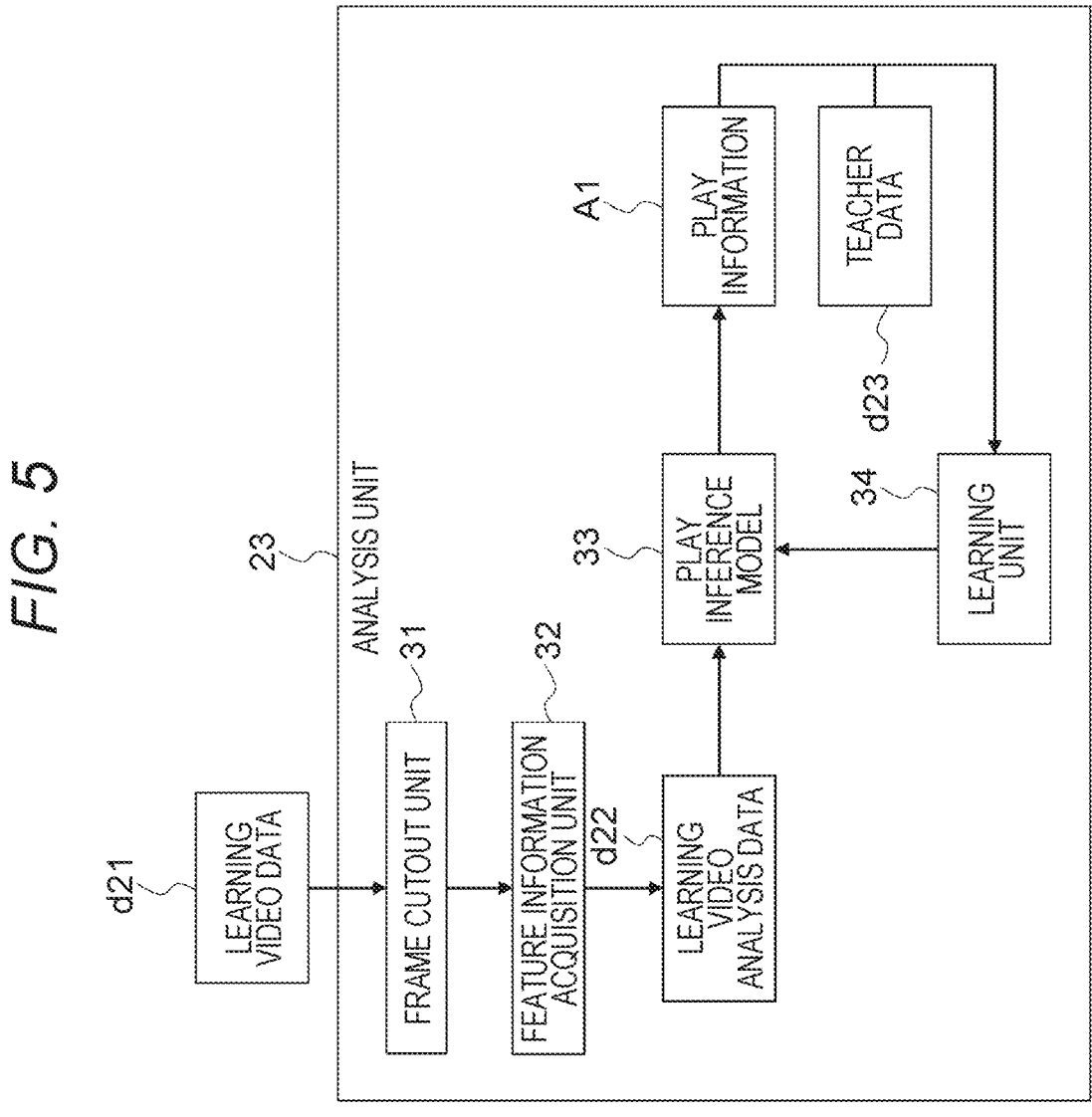
FIG. 5 is a block diagram illustrating an example of a functional configuration related to learning processing of a play inference model.
Figure 6:
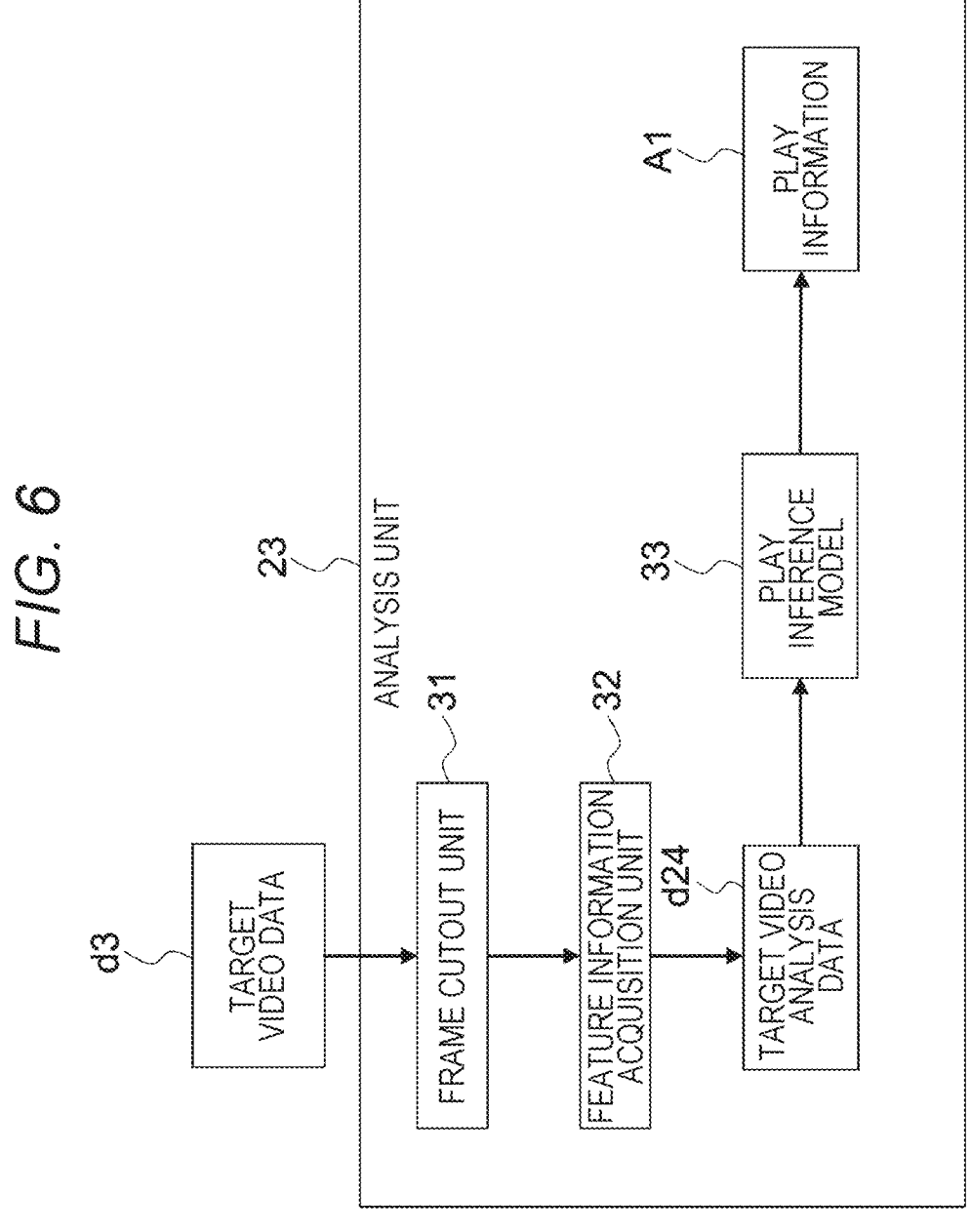
FIG. 6 is a block diagram illustrating an example of a functional configuration related to play information acquisition processing (inference processing) using a play inference model.

FIG. 5 is a block diagram illustrating an example of a functional configuration related to learning processing of the play inference model 33. FIG. 6 is a block diagram illustrating an example of a functional configuration related to the acquisition processing (inference processing) of the play information A1 using the play inference model 33.

First, learning processing of the play inference model 33 will be described.

The analysis unit 23 illustrated in FIG. 5 includes a frame cutout unit 31, a feature information acquisition unit 32, a play inference model 33, and a learning unit 34.

The frame cutout unit 31 cuts out a desired number of video frames (still images) from an input learning video data d21.

The feature information acquisition unit 32 performs image analysis on each video frame cut out by the frame cutout unit 31, and acquires a learning video analysis data d22 representing feature information in each video frame.

As an example, the feature information acquisition unit 32 can acquire information of one or more coordinate points representing a posture of one or more persons in each video frame as the learning video analysis data d22. That is, the feature information acquisition unit 32 can acquire coordinate information indicating a joint or other feature part of a person, and acquire the learning video analysis data d22 indicating the posture of a hand, a foot, or other body part on the basis of the coordinate information (see FIGS. 20A and 20B to be described later). When the information on the body part of the target person is acquired from the target video frame, any analysis technique (for example, "key point detection technique" for detecting a feature point such as a joint of the target person) can be used.

Note that the learning video analysis data d22 acquired by the feature information acquisition unit 32 may include information regarding other than the posture of the body part or may not include information indicating the posture of the body part. However, the learning video analysis data d22 is information that can be derived by the feature information acquisition unit 32 analyzing the learning video data d21, and includes information directly or indirectly associated with the play information A1.

The play inference model 33 is a learned model learned to output a play information A1 on the basis of the learning video analysis data d22. An algorithm of the play inference model 33 is not limited, and any algorithm (neural network or the like) that can output the corresponding play information A1 when the learning video analysis data d22 is input can be adopted.

The play inference model 33 may output the play information A1 on the basis of the learning video analysis data d22 obtained from a single video frame, or may output the play information A1 on the basis of the learning video analysis data d22 obtained from a plurality of video frames. In particular, in a case where the play information A1 indicating the play that continuously changes over time is acquired, the play inference model 33 may output the corresponding play information A1 by receiving the learning video analysis data d22 of a plurality of video frames continuous in time series. In this case, improvement of the derivation accuracy of the play information A1 derived by the play inference model 33 can be expected.

The learning unit 34 learns the play inference model 33 on the basis of the play information A1 output from the play inference model 33 to which the learning video analysis data d22 is input and a teacher data d23.

A specific learning method by the learning unit 34 is not limited. Typically, the learning unit 34 evaluates an error of the play information A1 with respect to the teacher data d23, and corrects the play inference model 33 so as to minimize the error, thereby being capable of learning the play inference model 33. Note that the teacher data d23 indicating the correct answer of the play information recorded in the learning video data d21 can be prepared by an arbitrary method.

Next, inference processing using the play inference model 33 will be described.

The analysis unit 23 illustrated in FIG. 6 includes a frame cutout unit 31, a feature information acquisition unit 32, and a play inference model 33.

The target video data d3 is input to the analysis unit 23, and then the frame cutout unit 31 cuts out a desired number of video frames from the target video data d3. Then, the feature information acquisition unit 32 performs image analysis on each cutout video frame, thereby acquiring target video analysis data d24 representing feature information in each video frame. The processing of acquiring the target video analysis data d24 from the target video data d3 may be the same as the processing illustrated in FIG. 5 described above of acquiring the learning video analysis data d22 from the learning video data d21, or may be partially or entirely different.

The target video analysis data d24 obtained in this manner is input to the learned play inference model 33, and then the play information A1 is output from the play inference model 33.

As described above, in the present example, the learning processing of the play inference model 33 is performed by inputting the learning video data d21 to the analysis unit 23, and the inference processing is performed by the play inference model 33 and the play information A1 is acquired by inputting the target video data d3 to the analysis unit 23.

Note that the genre of the event (learning event) recorded in the learning video data d21 (see FIG. 5) may be the same as or different from the genre of the event (target event) recorded in the target video data d3 (see FIG. 6).

For example, in a case where the target video data d3 records a rugby game, learning processing of the play inference model 33 is typically performed using the learning video data d21 that records the rugby game.

However, the learning video data d21 for recording an event (for example, a soccer game) including a play similar to a rugby game may be used in the learning processing of the play inference model 33. For example, it is possible to use a kick video of rugby as one of the target video data d3 and the learning video data d21 and use a kick video of soccer as the other. In addition, it is possible to use a soccer slow-in video as one of the target video data d3 and the learning video data d21 and use a rugby line-out video as the other.

Further, one of the target video data d3 and the learning video data d21 may be the live-action video data and the other may be the generated video data.

The generated video data here may include video data (typically, animation video or computer graphics (CG) video) other than the live-action video data.

For example, the play information A1 may be acquired from the target video data d3 recording a live-action rugby game using the play inference model 33 learned using a play video of a rugby game on a computer such as e-sports as the learning video data d21. Conversely, the same applies, and the play information A1 may be acquired from the target video data d3 recording the play video of the rugby game on the computer by using the play inference model 33 learned using the learning video data d21 recording the live-action rugby game. For example, it is possible to use a live kick video related to a rugby game as one of the target video data d3 and the learning video data d21 and use a CG kick video related to a rugby game as the other.

Therefore, the live-action video data and the generated video data of different genres can be used as the target video data d3 and the learning video data d21. For example, one of the target video data d3 and the learning video data d21 may record a live-action boxing play video (for example, punch video), and the other may record a play video (for example, punch video) of a fighting game on a computer.

Figure 7:
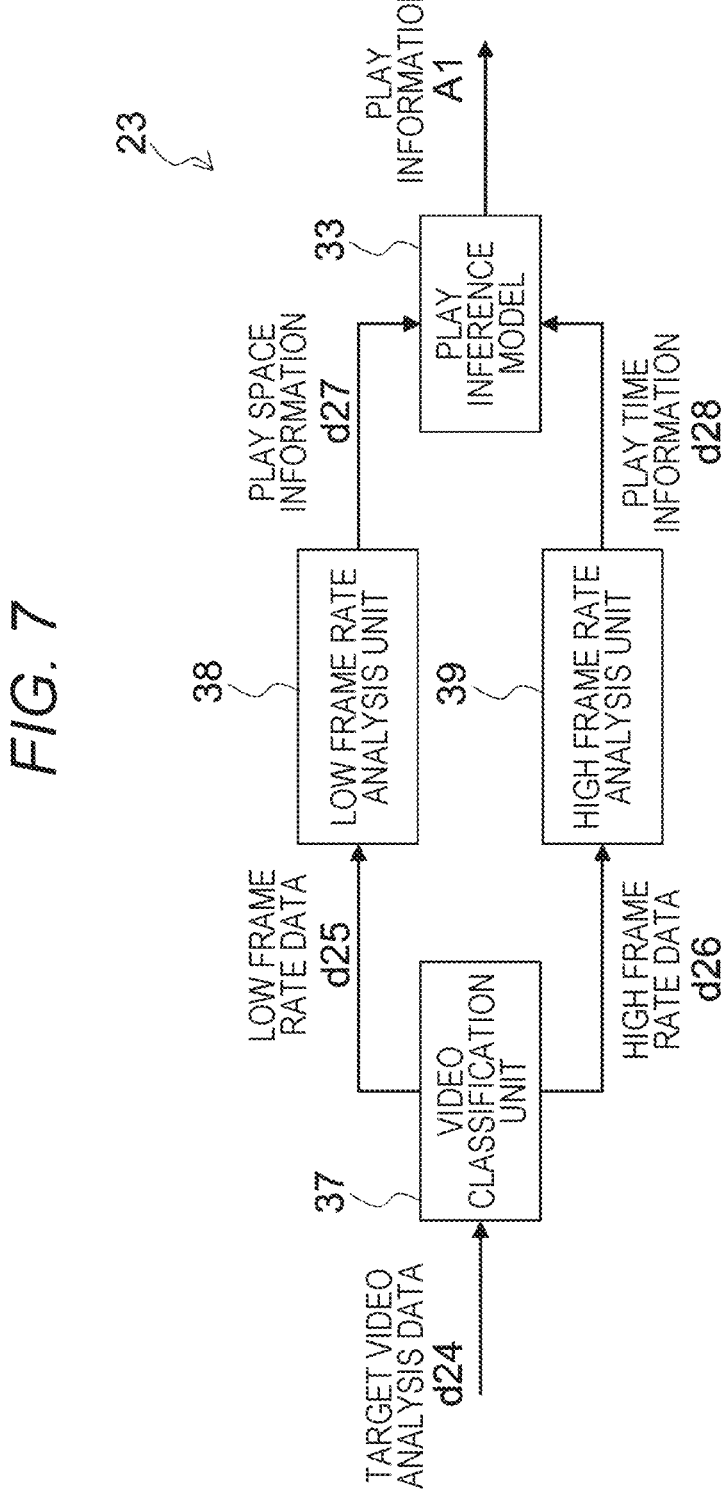
FIG. 7 is a block diagram illustrating a functional configuration related to another example of the play information inference processing using the play inference model.

FIG. 7 is a block diagram illustrating a functional configuration related to another example of the inference processing of the play information A1 using the play inference model 33. An algorithm illustrated in FIG. 7 described below is also applied to, for example, an image analysis technique called SlowFast.

In the example illustrated in FIG. 7, the analysis unit 23 includes a video classification unit 37, a low frame rate analysis unit 38, a high frame rate analysis unit 39, and a play inference model 33.

The video classification unit 37 receives the target video analysis data d24 based on a plurality of video frames, and cuts out low frame rate data d25 and high frame rate data d26 from the target video analysis data d24.

The low frame rate data d25 is set data of a plurality of video frames corresponding to a relatively low frame rate (for example, 1 fps (frames per second)) among a large number of video frames configuring the target video analysis data d24. The high frame rate data d26 is set data of a plurality of video frames corresponding to a relatively high frame rate (for example, 30 fps) among a large number of video frames configuring the target video analysis data d24.

Then, the low frame rate analysis unit 38 analyzes the low frame rate data d25 to acquire play space information d27. On the other hand, the high frame rate analysis unit 39 analyzes the high frame rate data d26 to acquire play time information d28.

Note that the low frame rate data d25 and the high frame rate data d26 may be transmitted and received between the low frame rate analysis unit 38 and the high frame rate analysis unit 39. For example, the low frame rate analysis unit 38 may acquire the play space information d27 on the basis of not only the low frame rate data d25 from the video classification unit 37 but also the play time information d28 from the high frame rate analysis unit 39.

Then, the play space information d27 and the play time information d28 are input to the play inference model 33 so that the play information A1 may be output from the play inference model 33. As the play information A1 is inferred on the basis of both the viewpoints of spatial information and temporal information derived from the target video analysis data d24 in this manner, improvement in the inference accuracy of the play information A1 can be expected.

Scene Information

Figure 8:
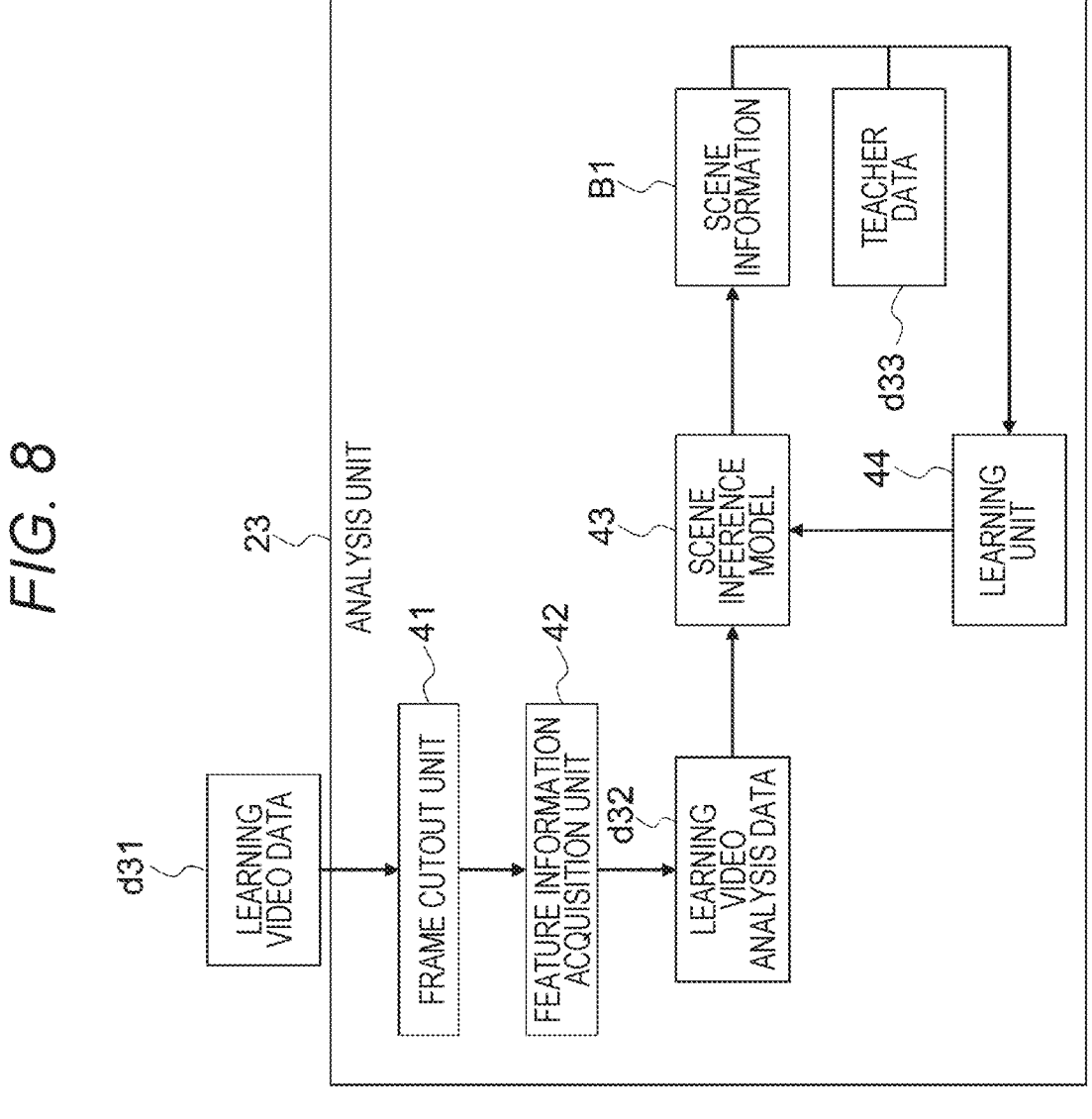
FIG. 8 is a block diagram illustrating an example of a functional configuration related to learning processing of a scene inference model.
Figure 9:
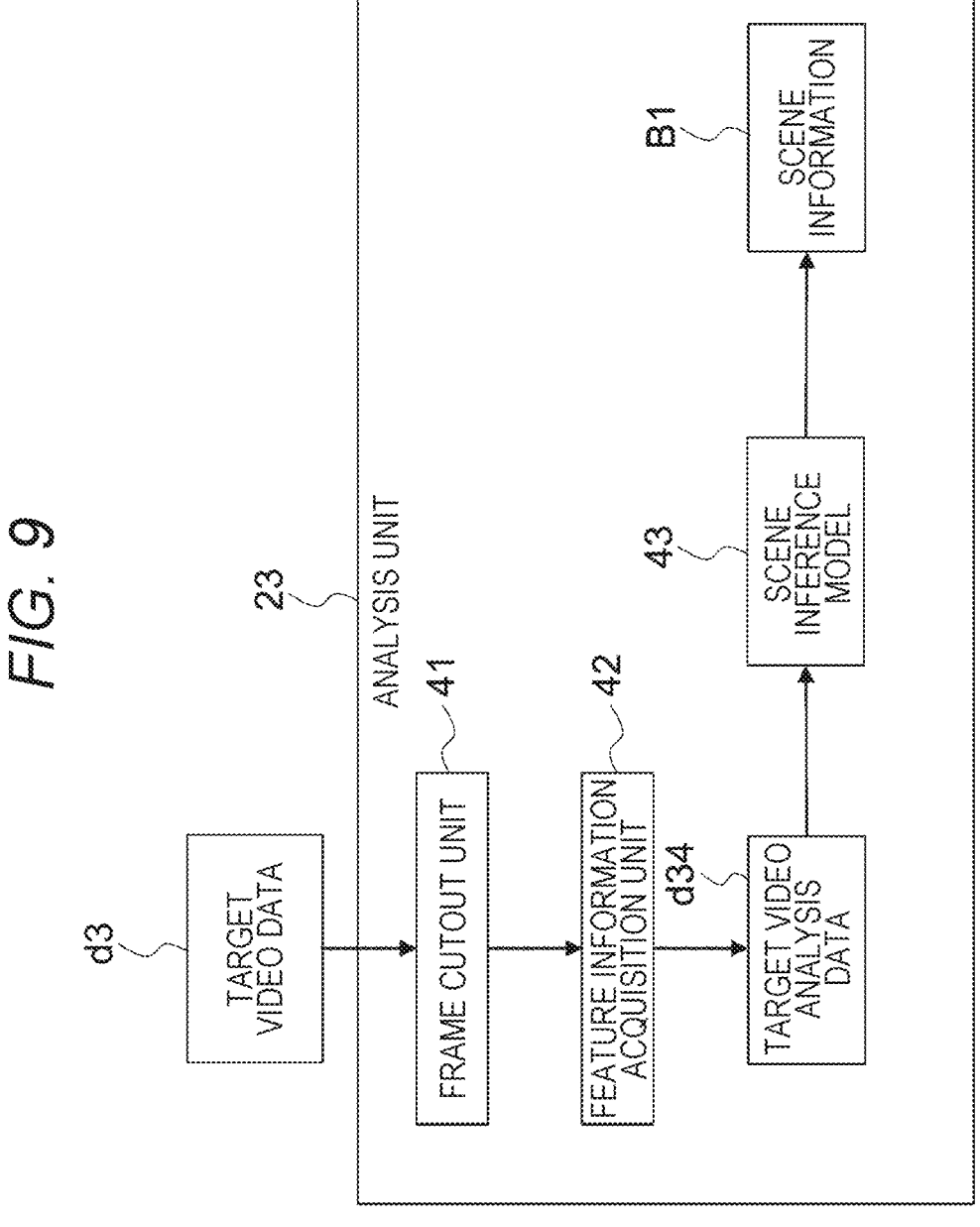
FIG. 9 is a block diagram illustrating an example of a functional configuration related to scene information acquisition processing (inference processing) using a scene inference model.

FIG. 8 is a block diagram illustrating an example of a functional configuration related to learning processing of the scene inference model 43. FIG. 9 is a block diagram illustrating an example of a functional configuration related to the process of acquiring the scene information B1 (inference process) using the scene inference model 43.

First, learning processing of the scene inference model 43 will be described.

The analysis unit 23 illustrated in FIG. 8 includes a frame cutout unit 41, a feature information acquisition unit 42, a scene inference model 43, and a learning unit 44.

The frame cutout unit 41 cuts out a desired number of video frames from the input learning video data d31. The frame cutout unit 41 may be provided in common with the above-described frame cutout unit 31 (see FIGS. 5 and 6) used for learning and inference of the play information A1, or may be provided separately.

The feature information acquisition unit 42 acquires learning video analysis data d32 representing the feature information in each video frame by performing image analysis on each video frame cut out by the frame cutout unit 41. The feature information acquisition unit 42 may be provided in common with the above-described feature information acquisition unit 32 (see FIGS. 5 and 6) used for learning and inference of the play information A1, or may be provided separately.

As an example, the feature information acquisition unit 42 can acquire information of one or more coordinate points representing the position of one or more persons in each video frame as the learning video analysis data d32 (see FIGS. 21A and 21B to be described later). Such information of the plurality of coordinate points can be used as basic information for acquiring the scene information B1 associated with relative positions of the plurality of persons.

Note that the learning video analysis data d32 acquired by the feature information acquisition unit 42 may include information regarding positions other than the positions of the plurality of persons, or may not include information indicating the positions of the plurality of persons. However, the learning video analysis data d32 is information that can be derived by the feature information acquisition unit 42 analyzing the learning video data d31, and includes information directly or indirectly associated with the scene information B1.

The scene inference model 43 is a learned model learned to output a scene information B1 on the basis of the learning video analysis data d32. An algorithm of the scene inference model 43 is not limited, and any algorithm that can output the corresponding scene information B1 upon receiving the learning video analysis data d32 can be adopted.

The scene inference model 43 may output the scene information B1 on the basis of the learning video analysis data d32 obtained from a single video frame, or may output the scene information B1 on the basis of the learning video analysis data d32 obtained from a plurality of video frames. In particular, in a case where the scene information B1 indicating a scene that continuously changes with time is acquired, the scene inference model 43 may output the corresponding scene information B1 by receiving the learn-ing video analysis data d32 of a plurality of video frames continuous in time series. In this case, improvement of the derivation accuracy of the scene information B1 derived by the scene inference model 43 can be expected.

The learning unit 44 learns the scene inference model 43 on the basis of the scene information B1 output from the scene inference model 43 to which the learning video analysis data d32 has been input and teacher data d33. A specific learning method by the learning unit 44 is not limited. Typically, the learning unit 44 can learn the scene inference model 43 by evaluating an error of the scene information B1 with respect to the teacher data d33 and correcting the scene inference model 43 so as to minimize the error. Note that the teacher data d33 indicating the correct answer of the scene information recorded in the learning video data d31 can be prepared by an arbitrary method.

Next, inference processing using the scene inference model 43 will be described.

The analysis unit 23 illustrated in FIG. 9 includes a frame cutout unit 41, a feature information acquisition unit 42, and a scene inference model 43.

The target video data d3 is input to the analysis unit 23, and then the frame cutout unit 41 cuts out a desired number of video frames from the target video data d3. Then, the feature information acquisition unit 42 performs image analysis on each cutout video frame, thereby acquiring target video analysis data d34 representing feature information in each video frame.

The processing of acquiring the target video analysis data d34 from the target video data d3 may be the same as the processing of acquiring the learning video analysis data d32 from the above-described learning video data d31 (see FIG. 8), or may be partially or entirely different.

When the target video analysis data d34 obtained in this manner is input to the learned scene inference model 43, the scene information B1 is output from the scene inference model 43.

As described above, in the present example, the learning processing of the scene inference model 43 is performed by inputting the learning video data d31 to the analysis unit 23, and the inference processing is performed by the scene inference model 43 to acquire the scene information B1 by inputting the target video data d3 to the analysis unit 23.

Note that the frame cutout unit 41 and the feature information acquisition unit 42 may be provided in common with the frame cutout unit 31 and the feature information acquisition unit 32 (see FIGS. 5 and 6) described above used for learning and inference of the play information A1. In this case, each of the target video analysis data d24 and d34 may be output in parallel from the feature information acquisition unit 42 and input to the play inference model 33 and the scene inference model 43, and the play information A1 and the scene information B1 may be output in parallel.

Note that the learning event recorded in the learning video data d31 may adopt a genre, a target, and a format common to or not common to the target video data d3, similarly to the learning video data d21 used at the time of learning of the play inference model 33.

Person Identification Information

Figure 10:
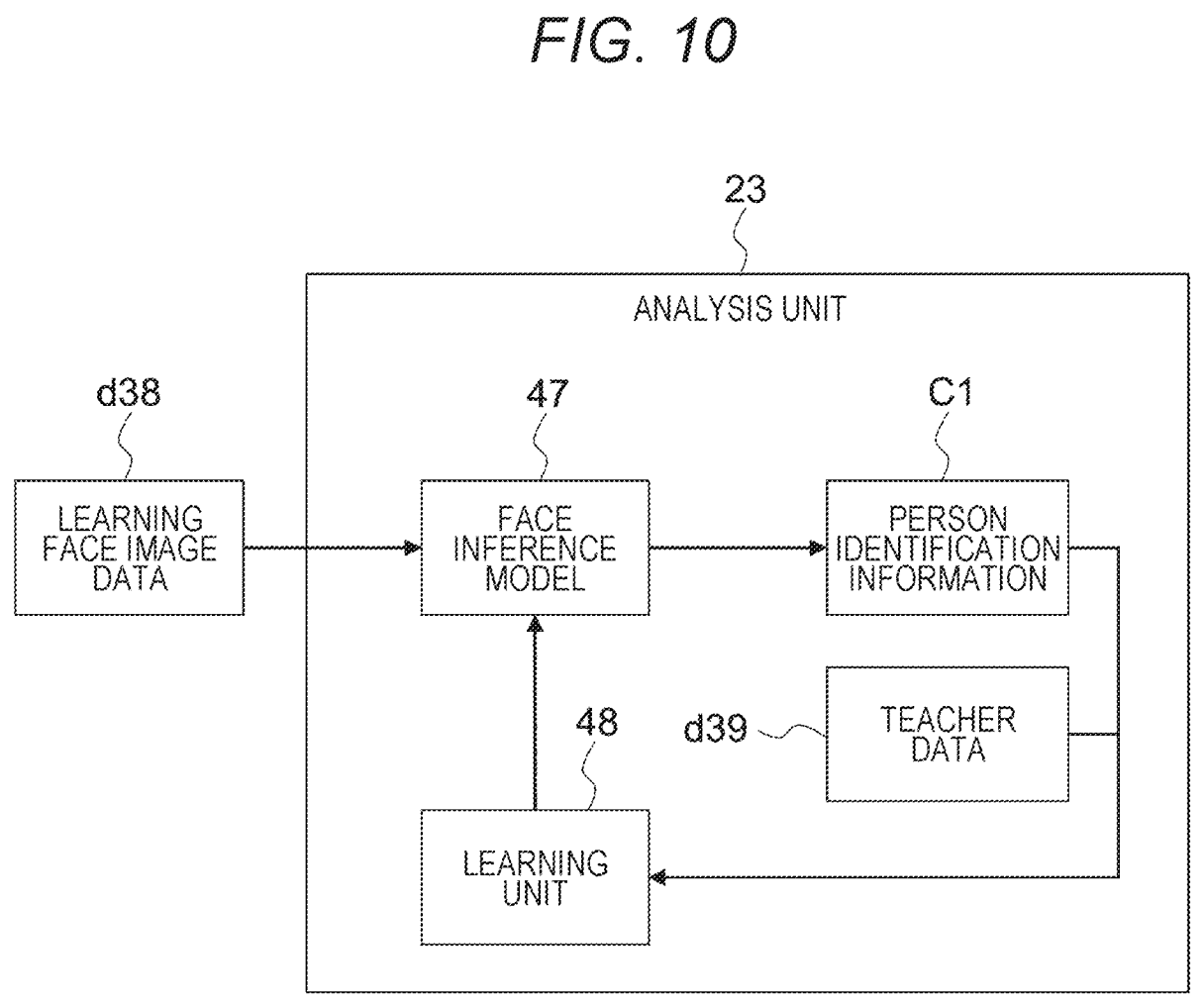
Figure 11:
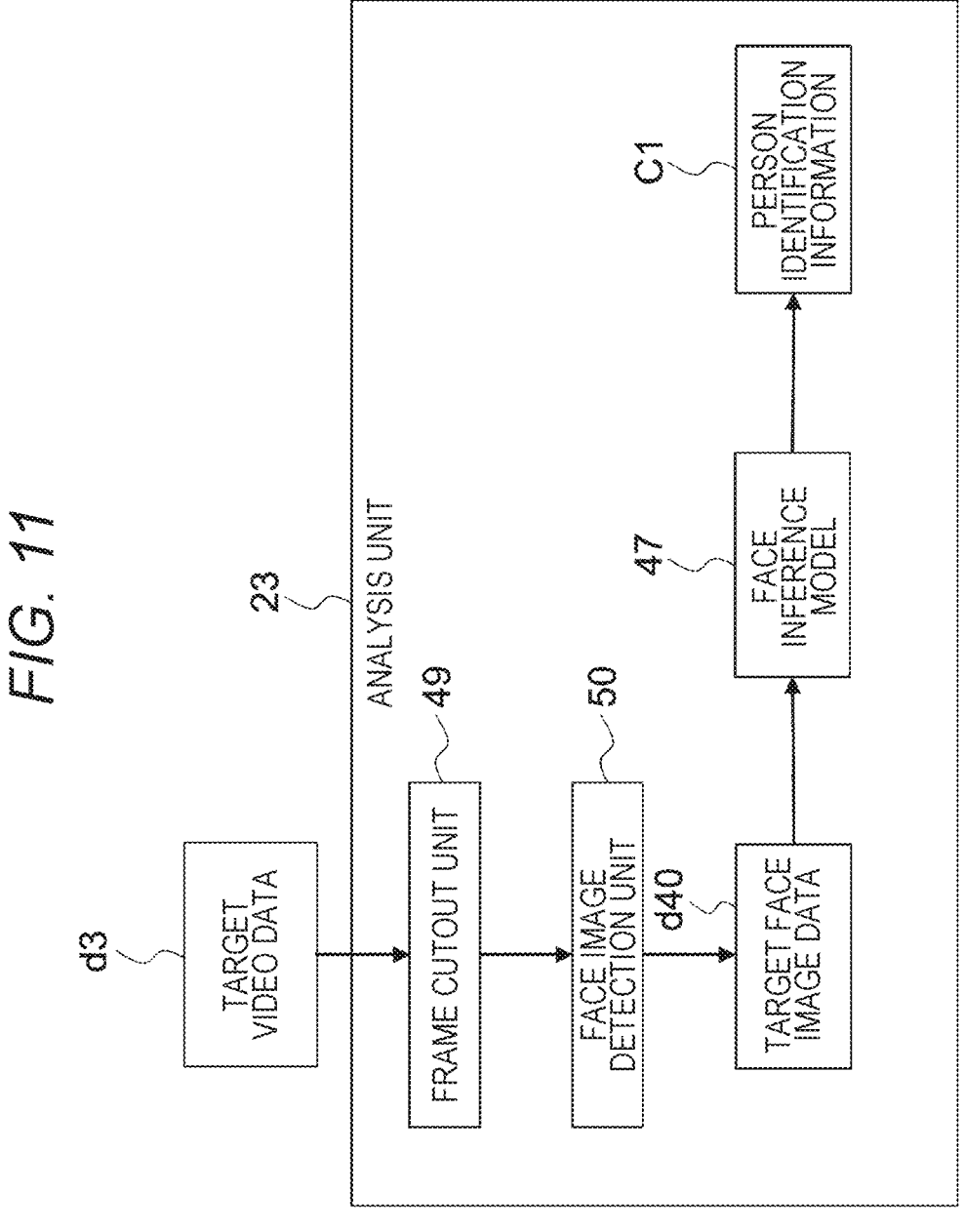
FIG. 11 is a block diagram illustrating an example of a functional configuration related to processing of acquiring person identification information (inference processing) using a face inference model.

FIG. 10 is a block diagram illustrating an example of a functional configuration related to learning processing of a face inference model 47. FIG. 11 is a block diagram illustrating an example of a functional configuration related to the process of acquiring the person identification information C1 (inference process) using the face inference model 47.

First, learning processing of the face inference model 47 will be described.

The analysis unit 23 illustrated in FIG. 10 includes a face inference model 47 and a learning unit 48.

The face inference model 47 is a learned model learned to output a person identification information C1 on the basis of a learning face image data d38. An algorithm of the face inference model 47 is not limited, and any algorithm that can output the corresponding person identification information C1 when the learning face image data d38 is input can be adopted.

The learning face image data d38 is not limited as long as it is data indicating a face image of a person specified by the person identification information C1. For example, face image data obtained through the network 19 can be used as the learning face image data d38. An arbitrary device (for example, the analysis unit 23) configuring the comment generation device 10 may collect face image data of a target person that can be used as the learning face image data d38 through the network 19 according to an arbitrary program.

The learning face image data d38 may be image data related to the target event recorded by the target video data d3 (for example, image data related to an event of the same genre as the target event) or may be image data not related thereto.

The learning unit 48 learns the face inference model 47 on the basis of the person identification information C1 output from the face inference model 47 to which the learning face image data d38 is input and the teacher data d39. A specific learning method by the learning unit 48 is not limited. Typically, the learning unit 48 can learn the face inference model 47 by evaluating an error of the person identification information C1 with respect to the teacher data d39 and correcting the face inference model 47 so as to minimize the error. The teacher data d39 indicating the correct answer of the person identification information recorded in the learning face image data d38 can be prepared by an arbitrary method.

Next, inference processing using the face inference model 47 will be described.

The analysis unit 23 illustrated in FIG. 11 includes a frame cutout unit 49, a face image detection unit 50, and a face inference model 47.

When the target video data d3 is input to the analysis unit 23, the frame cutout unit 49 cuts out a desired number of video frames from the target video data d3. Then, the face image detection unit 50 performs image analysis of each cutout video frame to acquire a target face image data d40 in each video frame. The process of acquiring the target face image data d40 from the target video data d3 is not limited, and a face image of a person is extracted from each video frame on the basis of an arbitrary face recognition technology.

When the target face image data d40 obtained in this manner is input to the learned face inference model 47, a person identification information C1 is output from the face inference model 47.

As described above, in the present example, the learning processing of the face inference model 47 is performed by inputting the learning face image data d38 to the analysis unit 23, and the inference processing is performed by the face inference model 47 to acquire the person identification information C1 by inputting the target video data d3 to the analysis unit 23.

Note that the frame cutout unit 49 may be provided in common with the above-described frame cutout units 31 and 41 used for learning and inference of the play information A1 and the scene information B1. In addition, the play information A1, the scene information B1, and the person identification information C1 may be acquired in parallel from the target video data d3.

Figure 12:
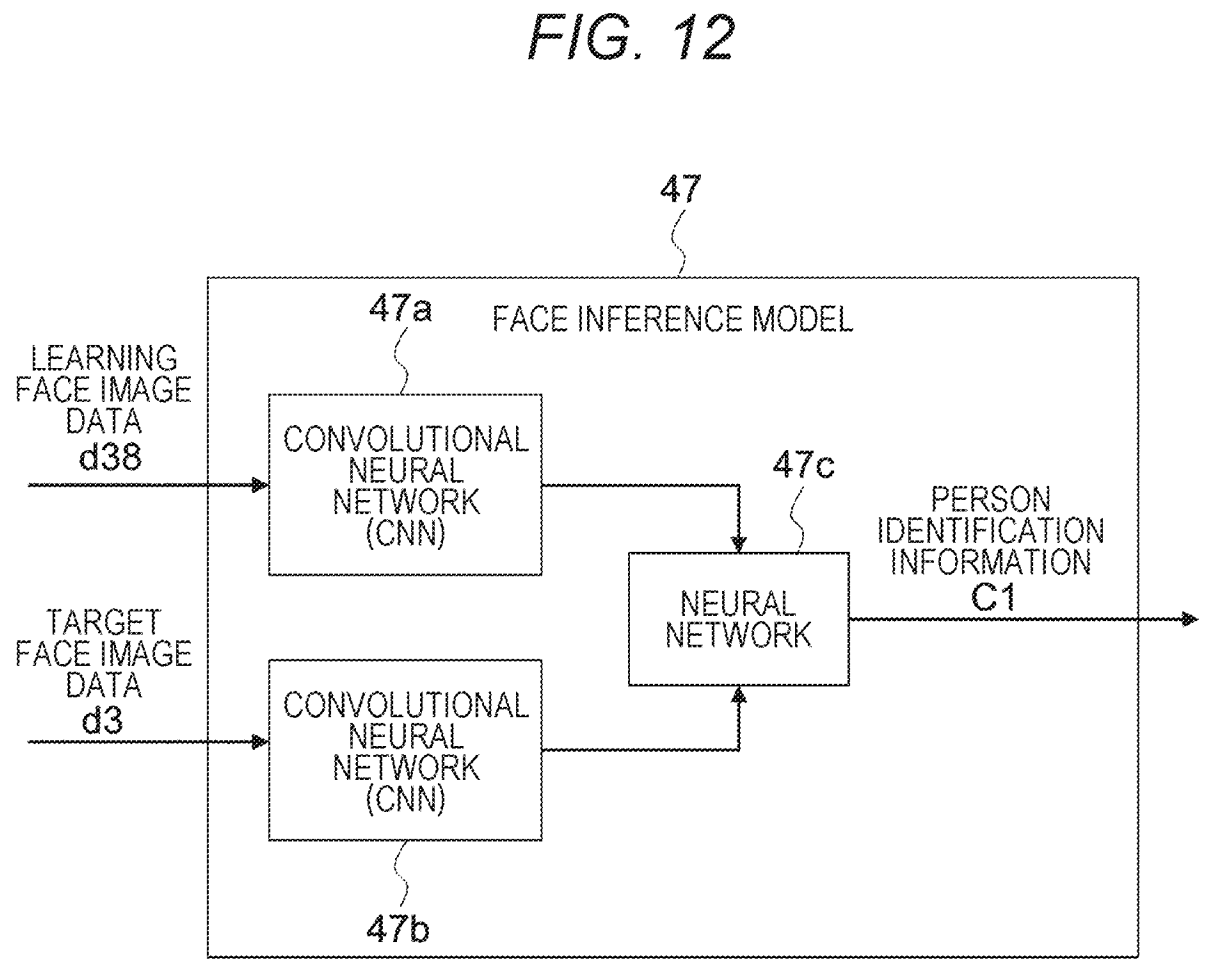

FIG. 12 is a block diagram illustrating a functional configuration related to another example of the inference processing of the person identification information C1 using the face inference model 47. The algorithm illustrated in FIG. 12 described below is also applied to an image analysis technology called FaceNet as an example.

The face inference model 47 illustrated in FIG. 12 includes a convolutional neural network (CNN) 47a, a convolutional neural network (CNN) 47b, and a neural network 47c.

The face inference model 47 receives learning face image data d38 and the target video data d3.

The learning face image data d38 is input to the convolutional neural network 47a. The convolutional neural network 47a analyzes the learning face image data d38 and outputs face image feature amount data in the learning face image data d38.

Similarly, the target video data d3 is input to the convolutional neural network 47b. The convolutional neural network 47b analyzes the target video data d3 and outputs face image feature amount data in the target video data d3.

The face image feature amount data obtained from the learning face image data d38 and the face image feature amount data obtained from the target video data d3 are input to the neural network 47c. The neural network 47c acquires a distance between the learning face image data d38 and the target video data d3 on the basis of the degree of approximation of the face image feature amount data input from the convolutional neural network 47a and the convolutional neural network 47b. The neural network 47c determines whether or not the person indicated by the face image of the target video data d3 is the same as the person indicated by the face image of the learning face image data d38 on the basis of the acquired distance between the image data.

The face inference model 47 selects one corresponding to the face image of the target video data d3 from a plurality of pieces of learning face image data d38 related to a plurality of persons according to the above-described processing flow, and outputs the person identification information C1 corresponding to the face image of the target video data d3 on the basis of the selection result.

Since the face inference model 47 of the present example outputs the person identification information C1 on the basis of an inter-image distance as described above, the determination processing of "to which class the face image of the target video data d3 belongs" is unnecessary. In general, in face recognition processing based on class classification, model learning using a large number of individual images tends to be required, whereas in face recognition processing based on an inter-image distance as in the present example, face recognition determination can be performed from a relatively small number of images.

Therefore, according to the present example, it is possible to acquire the person identification information C1 from the target video data d3 while reducing labor of preparing the learning face image data d38 in advance.

Uniform Number Information

Figure 13:
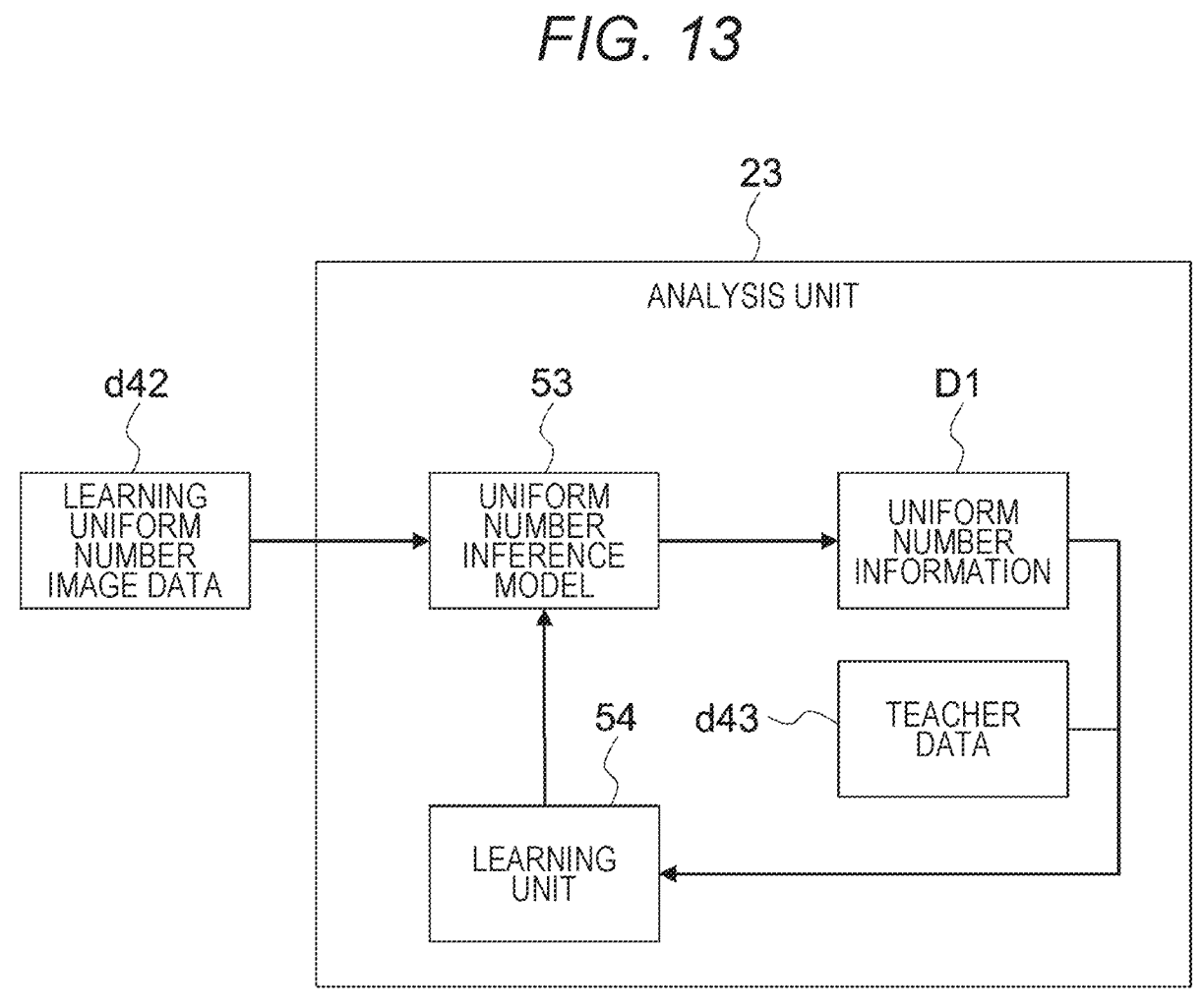
Figure 14:
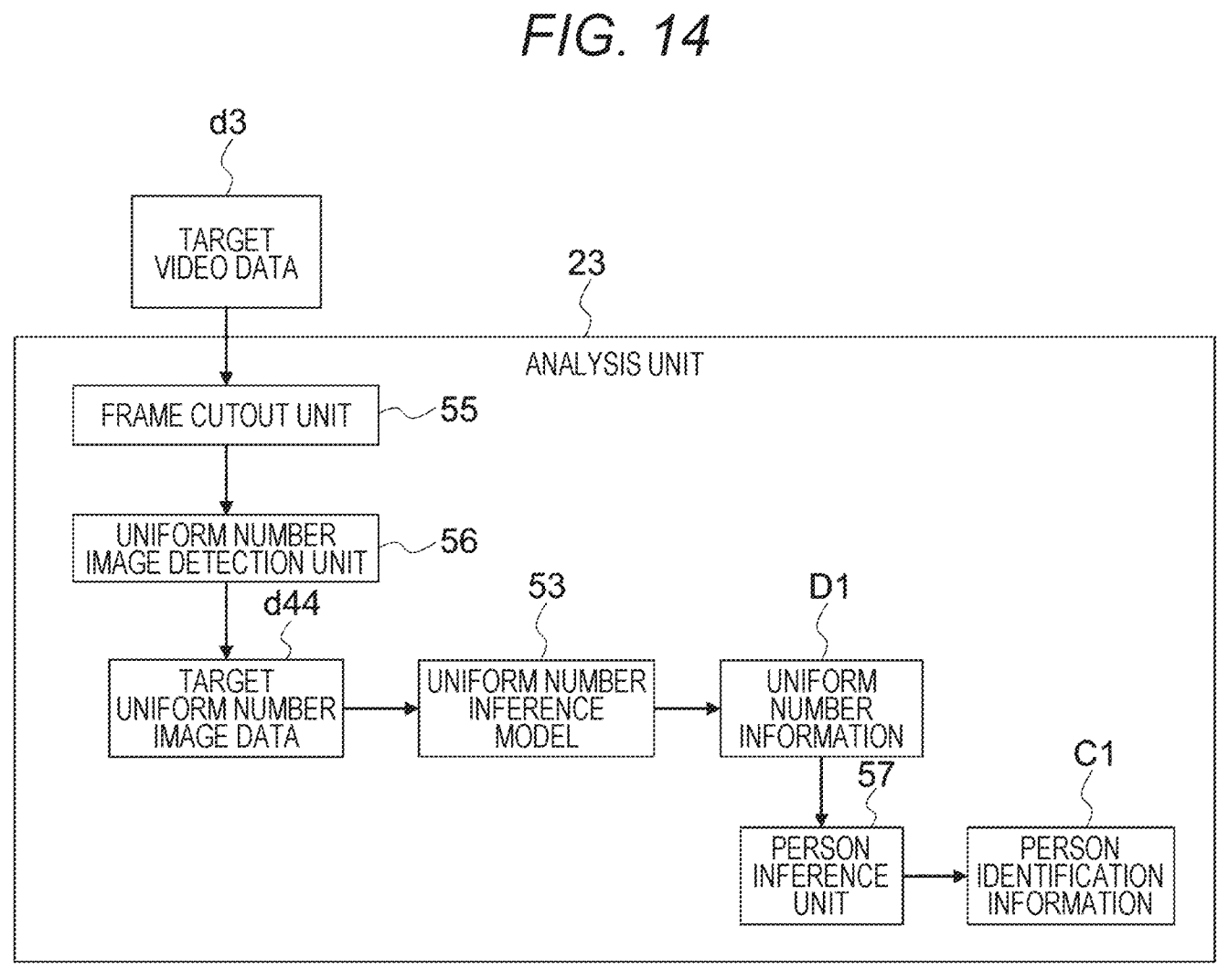

FIG. 13 is a block diagram illustrating an example of a functional configuration related to learning processing of a uniform number inference model 53. FIG. 14 is a block diagram illustrating an example of a functional configuration related to the acquisition processing (inference processing) of a uniform number information D1 using the uniform number inference model 53.

First, learning processing of the uniform number inference model 53 will be described.

The analysis unit 23 illustrated in FIG. 13 includes the uniform number inference model 53 and a learning unit 54.

The uniform number inference model 53 is a learned model learned to output a uniform number information D1 on the basis of the learning uniform number image data d42. An algorithm of the uniform number inference model 53 is not limited, and any algorithm that can output the corresponding uniform number information D1 when the learning uniform number image data d42 is input can be adopted.

The learning uniform number image data d42 is not limited as long as it is data indicating the uniform number specified by the uniform number information D1. For example, the uniform number image data obtained through the network 19 can be used as the learning uniform number image data d42. The learning uniform number image data d42 may be image data related to the event (target event) recorded by the target video data d3 or image data not related thereto.

The learning unit 54 learns the uniform number inference model 53 based on the uniform number information D1 output from the uniform number inference model 53 to which the learning uniform number image data d42 is input and the teacher data d43. A specific learning method by the learning unit 54 is not limited. Typically, the learning unit 54 evaluates an error of the uniform number information D1 with respect to the teacher data d43, and corrects the uniform number inference model 53 so as to minimize the error, thereby being capable of learning the uniform number inference model 53. The teacher data d43 indicating the correct answer of the uniform number information recorded in the learning uniform number image data d42 can be prepared by an arbitrary method.

Next, inference processing using the uniform number inference model 53 will be described.

The analysis unit 23 illustrated in FIG. 14 includes a frame cutout unit 55, a uniform number image detection unit 56, a uniform number inference model 53, and a person estimation unit 57.

When the target video data d3 is input to the analysis unit 23, the frame cutout unit 55 cuts out a desired number of video frames from the target video data d3. Then, the uniform number image detection unit 56 performs image analysis on each cutout video frame, thereby acquiring a target uniform number image data d44 in each video frame. The process of acquiring the target uniform number image data d44 from the target video data d3 is not limited, and the uniform number image is extracted from each video frame on the basis of an arbitrary image recognition technique.

When the target uniform number image data d44 obtained in this manner is input to the learned uniform number inference model 53, the uniform number information D1 is output from the uniform number inference model 53.

As described above, in the present example, the learning processing of the uniform number inference model 53 is performed by inputting the learning face image data d38 to the analysis unit 23, and the inference processing is performed by the uniform number inference model 53 to acquire the uniform number information D1 by inputting the target video data d3 to the analysis unit 23.

Note that the frame cutout unit 55 may be provided in common with the above-described frame cutout units 31, 41, and 49 used for learning and inference of the play information A1, the scene information B1, and the person identification information C1. In addition, the play information A1, the scene information B1, the person identification information C1, and the uniform number information D1 may be acquired in parallel from the target video data d3.

The uniform number information D1 may be directly output as the event meta information d1, or may be used as basic information for acquiring the person identification information C1.

In the example illustrated in FIG. 14, the uniform number information D1 is input to the person estimation unit 57, and the person estimation unit 57 acquires the person identification information C1 from the uniform number information D1 and outputs the person identification information C1. As an example, the person estimation unit 57 can access a database (not illustrated) in which the uniform number and the person identification information C1 are associated with each other, and acquire and output the person identification information C1 associated with the uniform number indicated by the input uniform number information D1.

In this manner, the person identification information C1 can be acquired on the basis of any one or both of the face image analysis (FIGS. 11 and 12) and the uniform number analysis (FIG. 14) described above. That is, the person identification information C1 for identifying a person can be derived from at least one of "an image of an appearance of a person such as a face image" and "an image of an object worn by a person such as clothes".

Score Information and Time Information

Figure 15:
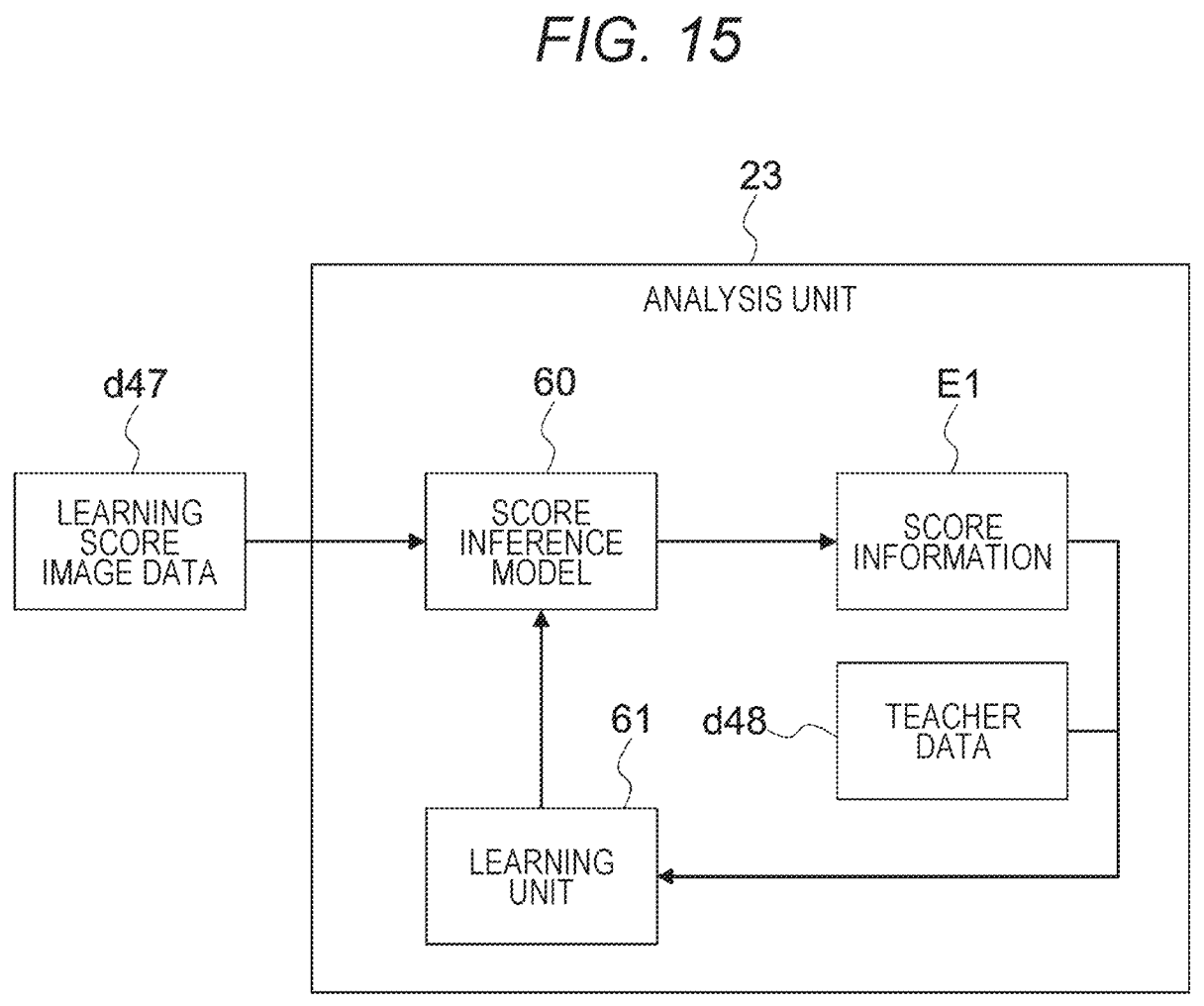
Figure 16:
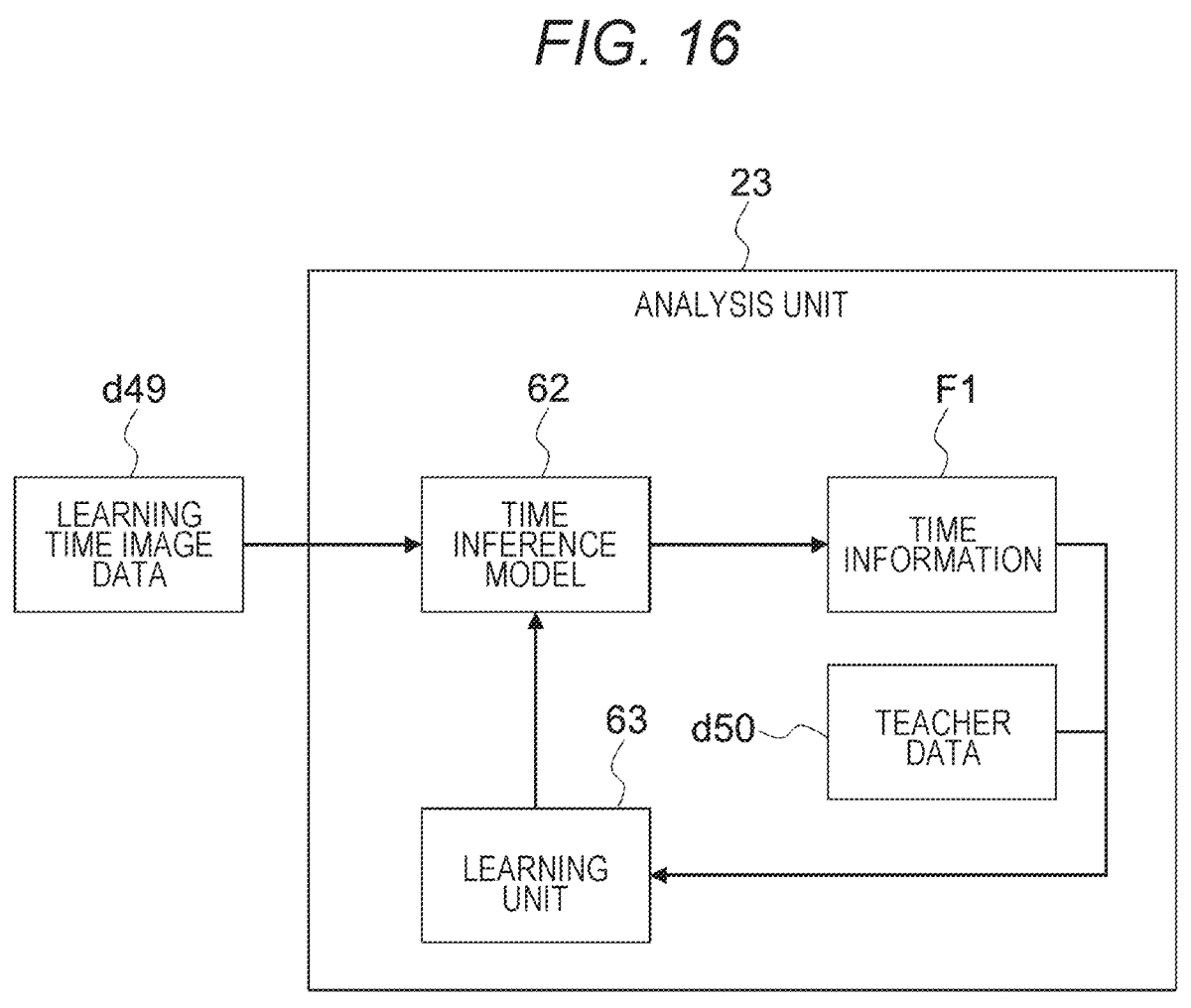
Figure 17:
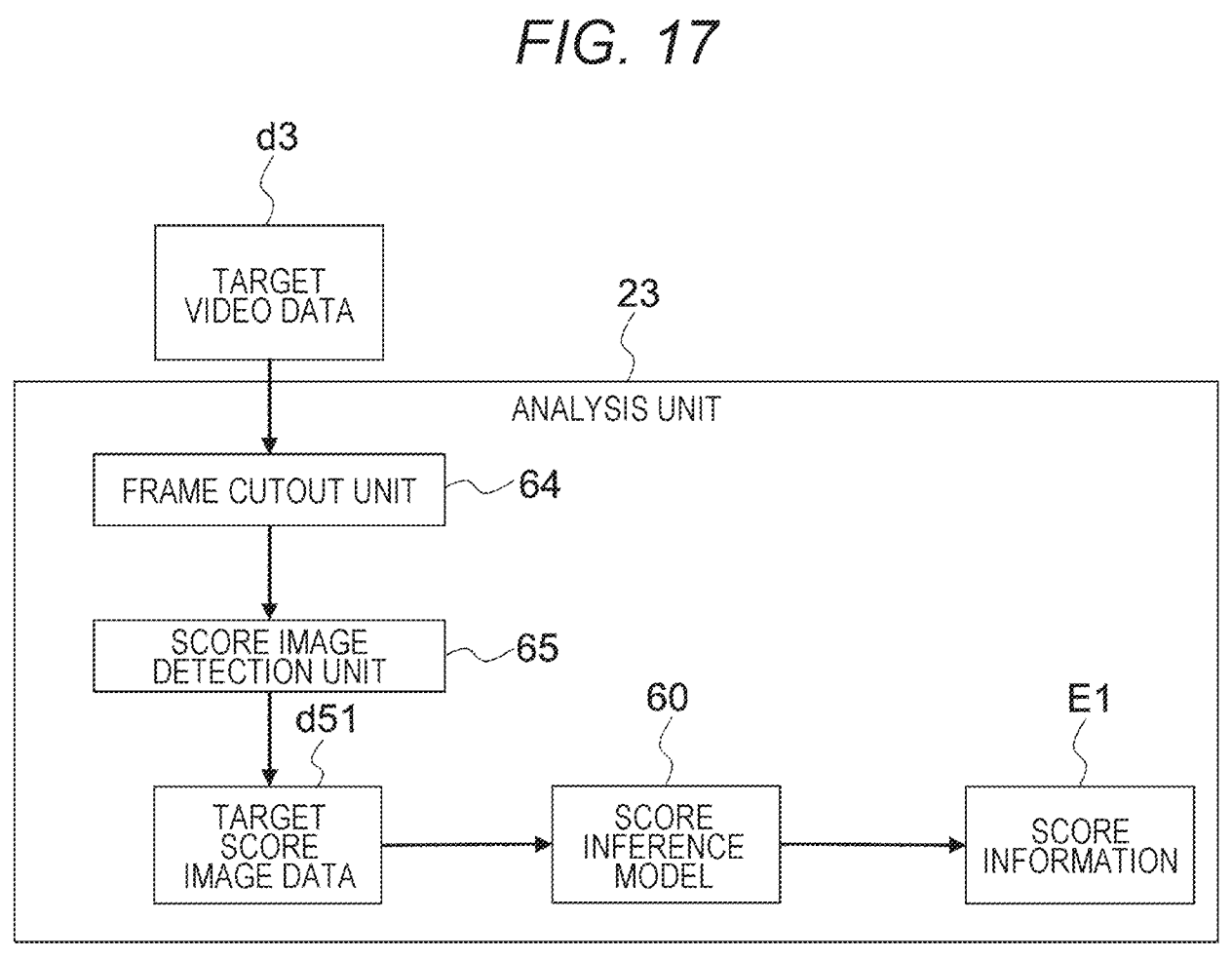

FIG. 15 is a block diagram illustrating an example of a functional configuration related to learning processing of a score inference model 60. FIG. 16 is a block diagram illustrating an example of a functional configuration related to learning processing of a time inference model 62. FIG. 17 is a block diagram illustrating an example of a functional configuration related to the acquisition processing (inference processing) of the score information E1 using the score inference model 60. FIG. 18 is a block diagram illustrating an example of a functional configuration related to the acquisition processing (inference processing) of the time information F1 using the time inference model 62.

First, learning processing of the score inference model 60 and the time inference model 62 will be described.

The analysis unit 23 illustrated in FIG. 15 includes the score inference model 60 and a learning unit 61.

The score inference model 60 is a learned model learned to output the score information E1 on the basis of learning score image data d47.

The learning unit 61 learns the score inference model 60 on the basis of the score information E1 output from the score inference model 60 to which the learning score image data d47 has been input and a teacher data d48. Typically, the learning unit 61 evaluates an error of the score information E1 with respect to the teacher data d48, and corrects the score inference model 60 so as to minimize the error, thereby being capable of learning the score inference model 60.

The analysis unit 23 illustrated in FIG. 16 includes a time inference model 62 and a learning unit 63.

The time inference model 62 is a learned model learned to output a time information F1 on the basis of a learning time image data d49.

The learning unit 63 learns the time inference model 62 on the basis of the time information F1 output from the time inference model 62 to which the learning time image data d49 has been input and a teacher data d50. Typically, the learning unit 61 can learn the time inference model 62 by evaluating an error of the time information F1 with respect to the teacher data d50 and correcting the time inference model 62 so as to minimize the error.

Note that the algorithms of the score inference model 60 and the time inference model 62 are not limited, and any algorithm capable of outputting the corresponding score information E1 and time information F1 by inputting the score image data and the time image data can be adopted.

The learning score image data d47 and the learning time image data d49 are not limited as long as they are data indicating a score image and a time image, respectively. For example, score image data and time image data obtained through the network 19 may be used as the learning score image data d47 and the learning time image data d49.

The learning score image data d47 and the learning time image data d49 may be image data related to the target event recorded in the target video data d3 or image data not related thereto.

A specific learning method by the learning unit 61 and the learning unit 63 is not limited. Note that the teacher data d48 and the teacher data d50 indicating the correct answer of the score information and the time information recorded in the learning score image data d47 and the learning time image data d49 can be prepared by an arbitrary method.

Next, inference processing using the score inference model 60 and the time inference model 62 will be described.

The analysis unit 23 illustrated in FIG. 17 includes a frame cutout unit 64, a score image detection unit 65, and a score inference model 60.

When the target video data d3 is input to the analysis unit 23, the frame cutout unit 64 cuts out a desired number of video frames from the target video data d3. Then, the score image detection unit 65 performs image analysis on each cutout video frame to acquire the target score image data d51 in each video frame.

When the target score image data d51 obtained in this manner is input to the learned score inference model 60, the score information E1 is output from the score inference model 60.

The analysis unit 23 illustrated in FIG. 18 includes the frame cutout unit 66, the time image detection unit 67, and the time inference model 62.

When the target video data d3 is input to the analysis unit 23, the frame cutout unit 66 cuts out a desired number of video frames from the target video data d3. Then, the time image detection unit 67 performs image analysis on each cutout video frame to acquire the target time image data d52 in each video frame.

When the target time image data d52 obtained in this manner is input to the learned time inference model 62, the time information F1 is output from the time inference model 62.

As described above, in the present example, the learning processing of the score inference model 60 is performed by inputting the learning score image data d47 to the analysis unit 23. Then, the target video data d3 is input to the analysis unit 23, so that inference processing is performed by the score inference model 60, and the score information E1 is acquired. In addition, the learning processing of the time inference model 62 is performed by inputting the learning time image data d49 to the analysis unit 23, and the inference processing is performed by the time inference model 62 and the time information F1 is acquired by inputting the target video data d3 to the analysis unit 23.

Note that the processing of acquiring the target score image data d51 and the target time image data d52 from the target video data d3 is not limited, and the score image and the time image are extracted from each video frame on the basis of an arbitrary image recognition technology.

The frame cutout units 64 and 66 may be provided in common with the above-described frame cutout units 31, 41, 49, and 55 used for learning and inference of the play information A1, the scene information B1, the person identification information C1, and the uniform number information D1. In addition, the play information A1, the scene information B1, the person identification information C1, the uniform number information D1, the score information E1, and the time information F1 may be acquired in parallel from the target video data d3.

Event Meta Information

As described above, the event meta information d1 may include "information related to a person" (for example, play information A1, scene information B1, person identification information C1, and uniform number information D1) and "information not related to a person" (for example, the score information E1 and the time information F1) which may vary depending on a person.

In particular, "play information A1 indicating the play content of the event" and "scene information B1 indicating the scene content of the event" are classified into situation meta information estimated on the basis of the motion information indicating the motion of the person obtained by analyzing the video data.

That is, the play information A1 can be determined according to the motion information based on the information on a body part of the person obtained by analyzing the video data. Further, the scene information B1 can be determined according to the motion information based on the information on the moving position of the person obtained by analyzing the video data.

Two or more of these pieces of information included in the event meta information d1 can be simultaneously acquired from a common target image (target video frame) in some cases, but only a single piece of information can be acquired from the target image in some cases. For example, in the case that event meta information d1 related to a person is acquired from the image data, only one of play information A1, scene information B1, and person identification information C1 may be acquired according to the state of the image of the person included in the image data.

Figure 19A:
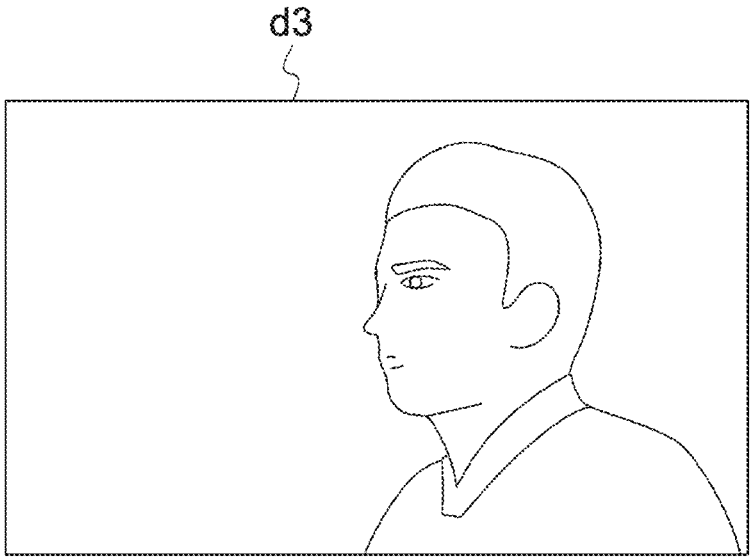
FIG. 19A illustrates an image example indicated by a video frame having target video data.
Figure 19B:
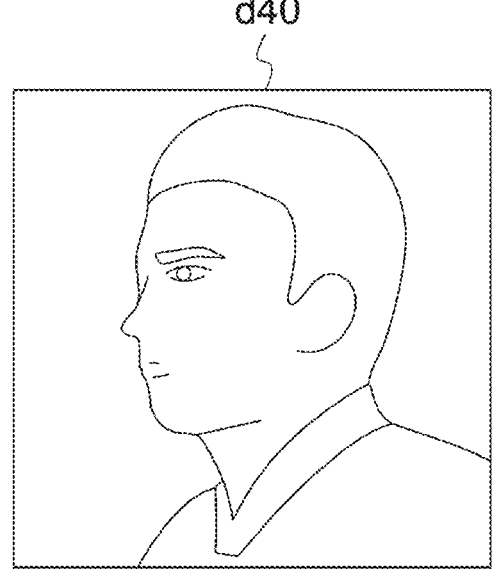
FIG. 19B illustrates an example of a face image (target face image data) detected from the video frame in FIG. 19A.
Figure 20A:
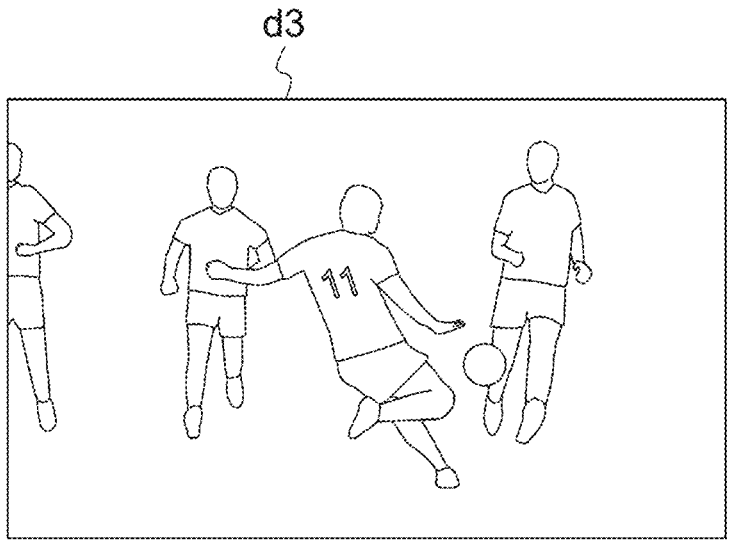
FIG. 20A illustrates an image example indicated by a video frame having target video data.
Figure 20B:
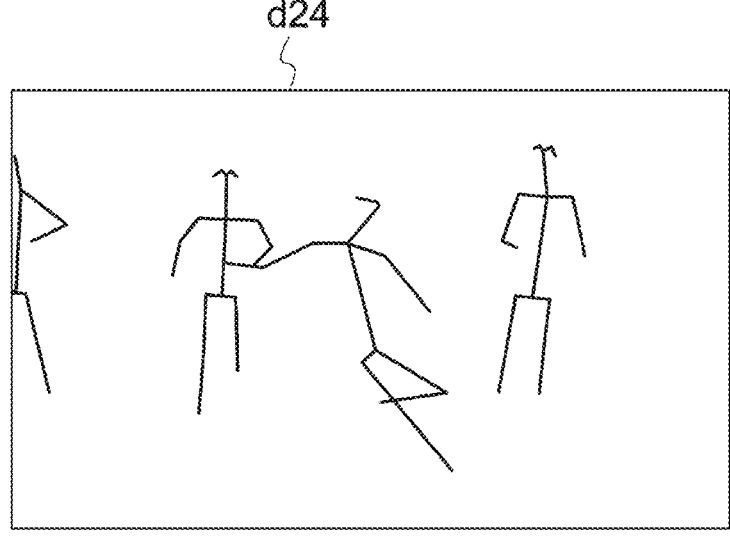
FIG. 20B illustrates an example of feature data (target video analysis data) acquired by analyzing the video frame in FIG. 20A.
Figure 21A:
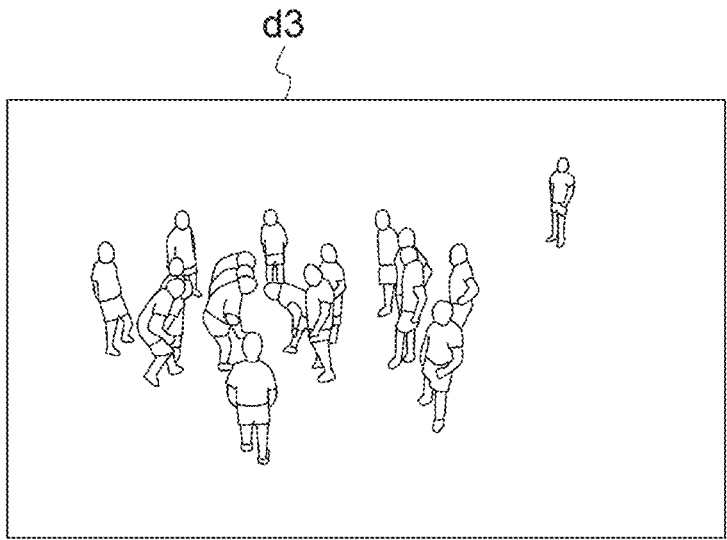
FIG. 21A illustrates an image example indicated by a video frame having target video data.
Figure 21B:
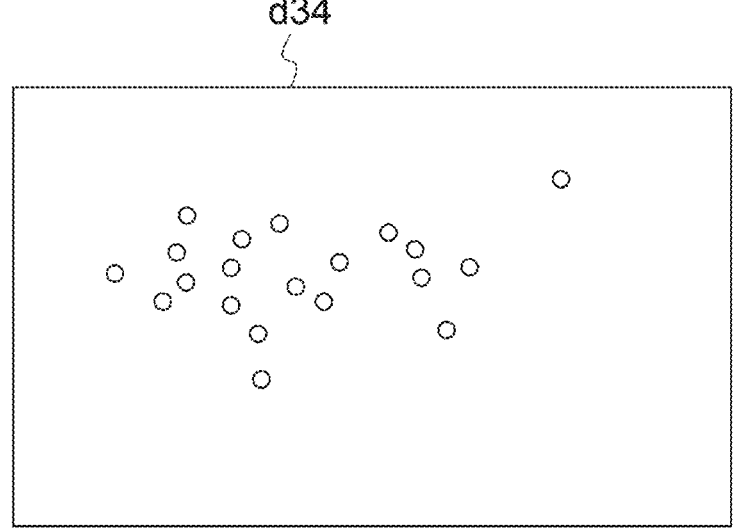
FIG. 21B illustrates an example of feature data (target video analysis data d) acquired by analyzing the video frame in FIG. 21A.

FIGS. 19A, 20A, and 21A illustrate image examples indicated by a certain video frame of the target video data d3. FIG. 19B illustrates an example of a face image (target face image data d40) detected from the video frame of FIG. 19A. FIG. 20B illustrates an example of feature data (target video analysis data d24) acquired by analyzing the video frame of FIG. 20A. FIG. 21B illustrates an example of feature data (target video analysis data d34) acquired by analyzing the video frame of FIG. 21A.

For example, there is a case where only one of the play information A1, the scene information B1, and the person identification information C1 can be obtained depending on a magnification (angle of view) of a zoom of a camera device at the time of imaging and acquiring the target video data d3.

A target video frame illustrated in FIG. 19A includes a clear image of a face of a person (for example, a player), but does not include an image of another body part such as a foot of the person, and does not include an image of another person. In this case, the face image can be extracted from the target video frame to acquire the person identification information C1. However, it is difficult to acquire the play information A1 and the scene information B1 from the target video frame.

On the other hand, a target video frame illustrated in FIG. 20A includes a clear image of body parts of an entire person, but does not include a clear image of the face of the person, and does not include a sufficient number of images of other persons. In this case, the information of the body part (for example, skeleton) of the target person can be derived from the target video frame by image analysis to acquire the play information A1. However, it is difficult to acquire the scene information B1 and the person identification information C1 from the target video frame.

On the other hand, a target video frame illustrated in FIG. 21A includes a sufficient number of images of persons, but does not include a clear image of an individual's face, has a large influence of occlusion in which persons overlap each other, and does not include a clear image of individual body parts. In this case, the position information of each person can be derived from the target video frame by image analysis to acquire the scene information B1. However, it is difficult to acquire the play information A1 and the person identification information C1 from the target video frame.

Learning Image Data

In the case of acquiring the event meta information d1 using the learned model as described above, in order to improve an inference accuracy of the model, it is required to learn the model using a large number of various pieces of learning image data (including the learning video data).

In order to secure a large number of various types of learning image data, in addition to image data for recording an event of the same genre as the event recorded in the target video data d3, image data for recording an event of another genre may be used as the learning image data. In addition to the live-action video data, the generated video data may be used as the learning image data.

Figure 22:
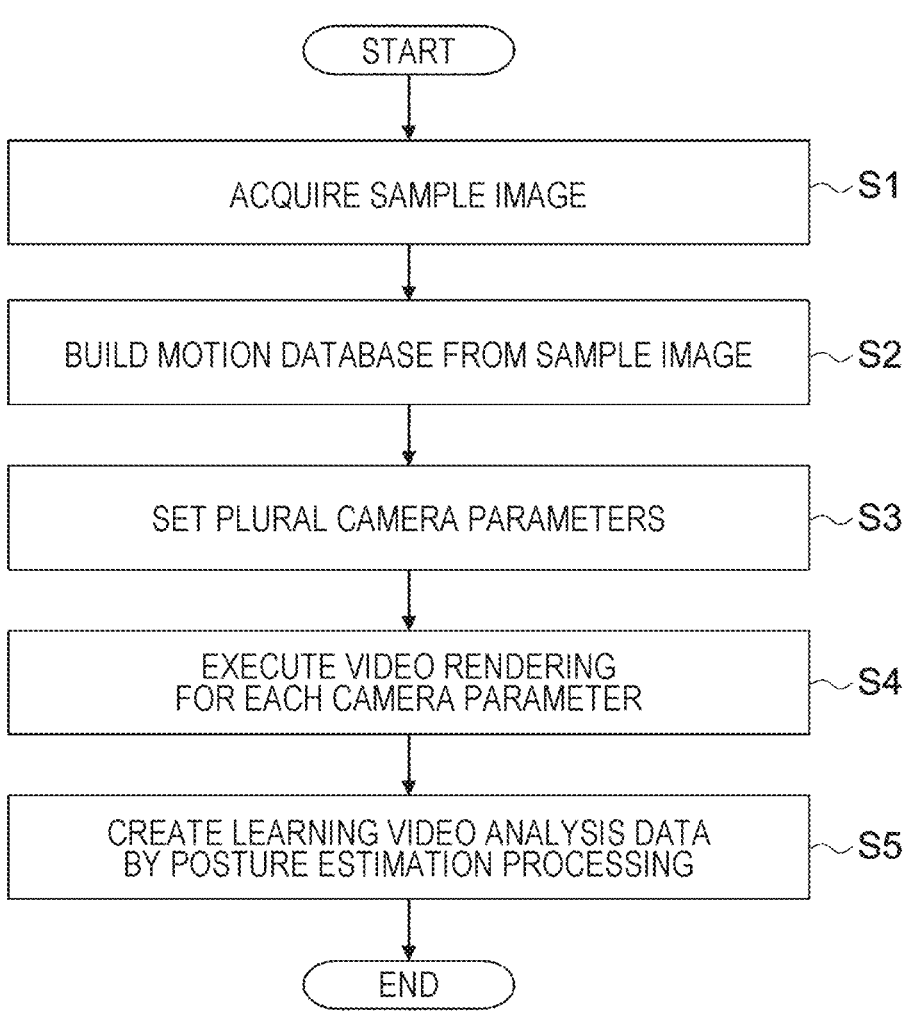
FIG. 22 is a flowchart illustrating a creation example of learning video analysis data including generation of learning video data based on a 3DCG technology.

FIG. 22 is a flowchart illustrating a creation example of the learning video analysis data including generation of the learning video data based on a 3 Dimensional Computer Graphics (3DCG) technology.

Note that the entire steps (S1 to S5) described below may be performed by the comment generation device 10, or only a part (for example, only S5) may be performed by the comment generation device 10, and other steps may be performed by an external device.

First, a sample image is acquired (S1), and a motion database is constructed from the sample image (S2).

The usable sample images are not limited. For example, images acquired by a plurality of imaging devices capturing images of the same person in different imaging directions can be used as sample images. In this case, a motion database based on three-dimensional data representing a human posture can be constructed from a plurality of images captured and acquired in various imaging directions.

The motion database thus constructed is typically constructed based on a musculoskeletal model of a person, but may be constructed on the basis of other body part characteristics.

Then, a plurality of camera parameters are set so as to three-dimensionally surround a person (S3), and video rendering is executed for each camera parameter (S4). As a result, the learning video data including the motion information indicating the motion of the person is generated.

With execution of image analysis processing (for example, posture estimation processing using key point detection technology) of the learning video data obtained in this manner, the learning target video analysis data can be acquired (S5).

With use of the generated video data as the learning image data as described above, it is possible to appropriately learn the inference model and to prepare the learned model having excellent inference accuracy even in a case where a sufficient number and variations of live-action learning image data cannot be prepared.

Generation of Live Commentary

Figure 23:
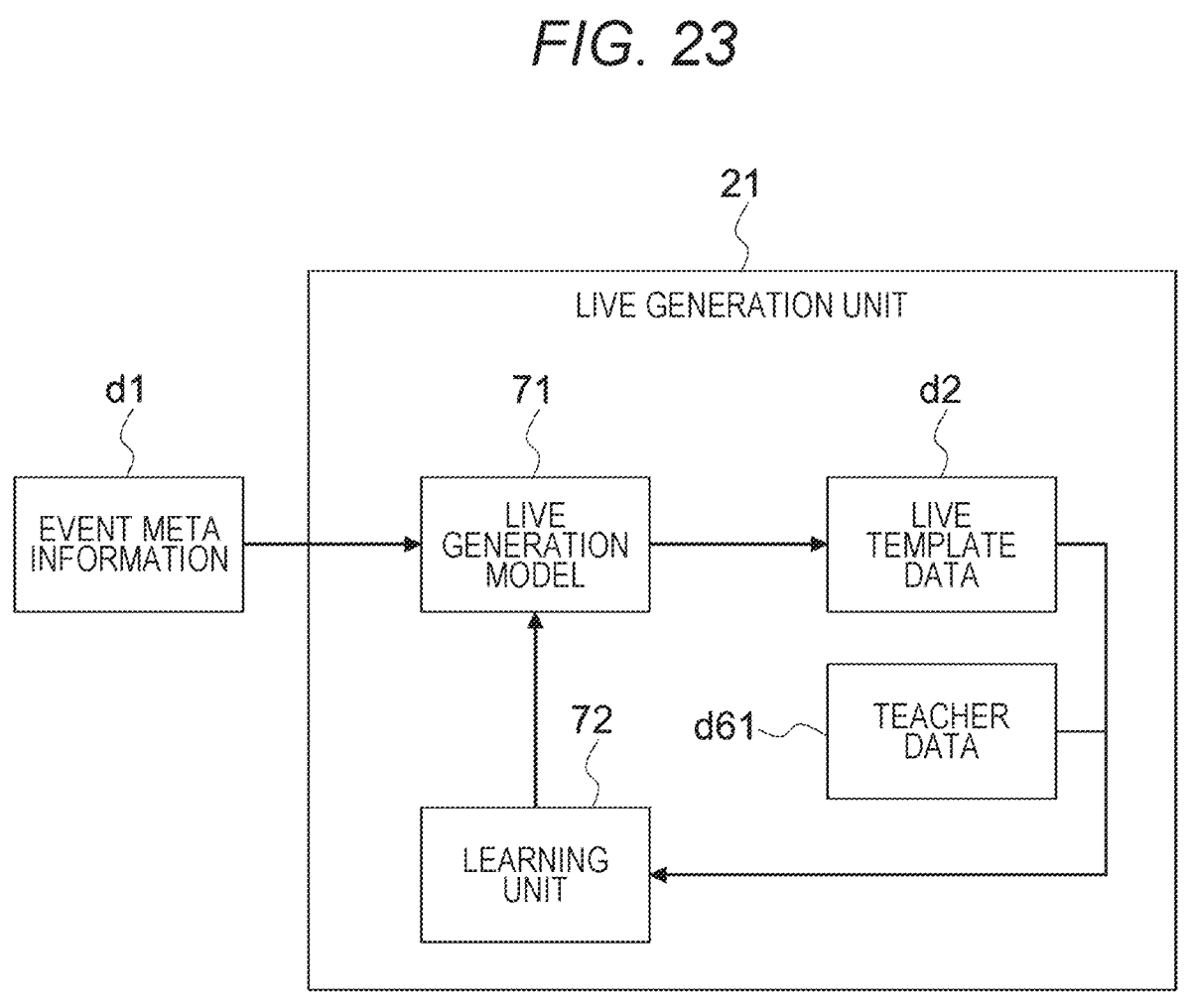
Figure 24:
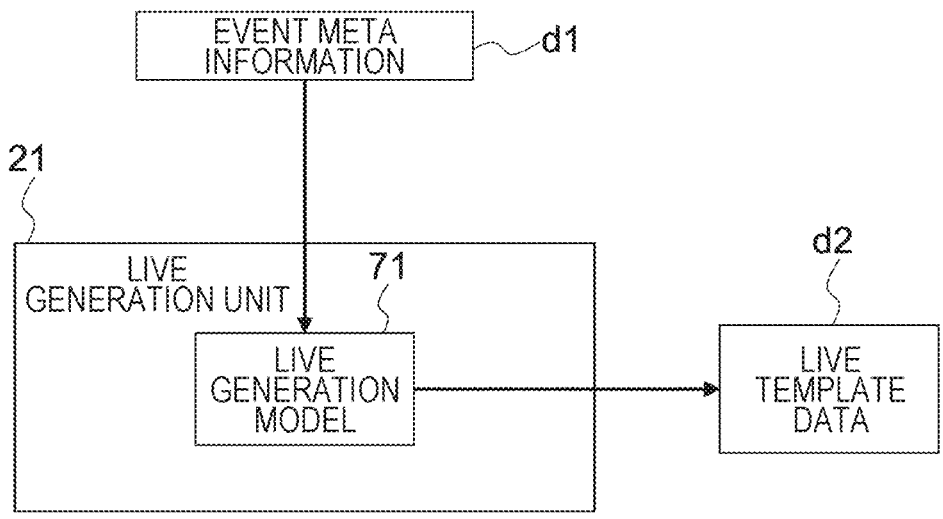
FIG. 24 is a block diagram illustrating an example of a functional configuration related to acquisition processing (inference processing) of the live template data using the live generation model.

FIG. 23 is a block diagram illustrating an example of a functional configuration related to learning processing of a live generation model 71. FIG. 24 is a block diagram illustrating an example of a functional configuration related to acquisition processing (inference processing) of the live template data d2 using the live generation model 71.

First, learning processing of the live generation model 71 will be described.

The live generation unit 21 illustrated in FIG. 23 includes the live generation model 71 and a learning unit 72.

The live generation model 71 is a learned model learned to output a plurality of pieces of live template data d2 on the basis of the event meta information d1. An algorithm of the live generation model 71 is not limited, and any algorithm that can output the corresponding live template data d2 when the event meta information d1 is input can be employed.

As described above, the event meta information d1 may include a plurality of pieces of information (for example, play information A1 to time information F1 illustrated in FIG. 4 described above). One or a plurality of pieces of information can be input to the live generation model 71 as the event meta information d1.

The learning unit 72 learns the live generation model 71 on the basis of the live template data d2 output from the live generation model 71 to which the event meta information d1 has been input and teacher data d61. A specific learning method by the learning unit 72 is not limited. Typically, the learning unit 72 evaluates an error of the live template data d2 with respect to the teacher data d61, and corrects the live generation model 71 so as to minimize the error, thereby being able to learn the live generation model 71.

The teacher data d61 indicating a correct answer of the live template data (live commentary) recorded in the event meta information d1 can be prepared by an arbitrary method. The learning unit 72 can learn the live generation model 71 by using, for example, the live template data extracted from the information disclosed in the network 19 according to the learning event meta information d1 as the teacher data d61.

Next, inference processing using the live generation model 71 will be described.

That is, when the event meta information d1 is input to the live generation unit 21 (in particular, the learned live generation model 71), a plurality of pieces of live template data d2 is output from the live generation model 71.

The event meta information d1 input to the live generation model 71 for generation of the live template data d2 may be the same as the event meta information d1 input to the live generation model 71 for learning of the live generation model 71. Furthermore, the event meta information d1 input to the live generation model 71 is known information, and can be appropriately determined by the user according to the target event recorded in the target video data d3.

Therefore, in the generation processing of the live commentary (that is, the learning processing and the inference processing of the live generation model 71), the video data (that is, the learning video data and the target video data) is unnecessary. However, the live template data d2 may be acquired using the video data. For example, the live generation unit 21 may analyze the learning video data, extract the live commentary used in the learning video data, perform correction processing of the live commentary as necessary, and then acquire the live template data d2 based on the live commentary.

The plurality of pieces of live template data d2 acquired by the live generation unit 21 (the live generation model 71) in this manner is saved in the live repository unit 22 (see FIG. 2).

As described above, in the present example, the learning processing of the live generation model 71 is performed by inputting the event meta information d1 to the live generation unit 21. Then, the event meta information d1 is input to the live generation unit 21, so that inference processing is performed in the live generation model 71, and a plurality of pieces of live template data d2 is acquired.

Figure 25:
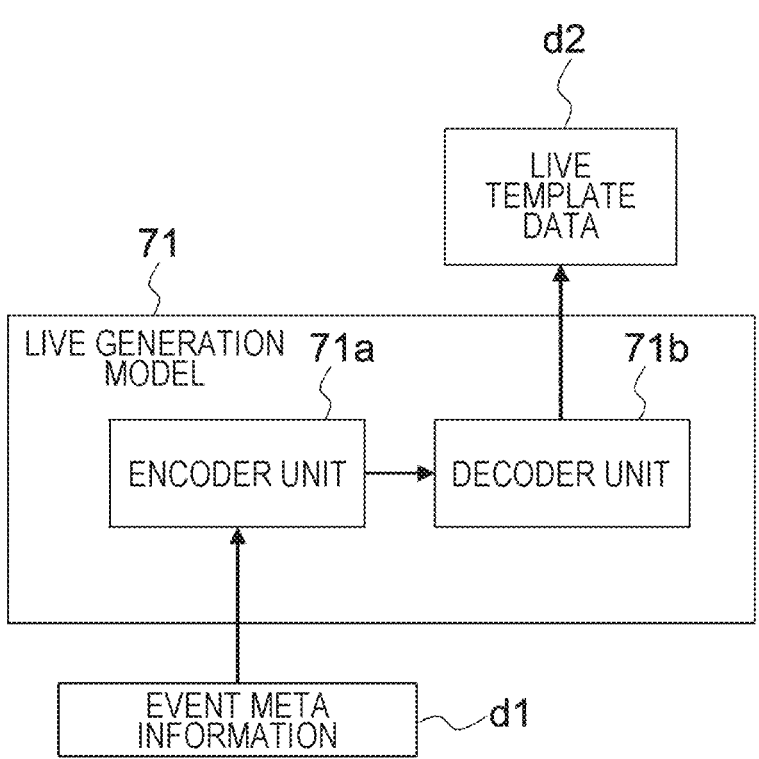
FIG. 25 is a block diagram illustrating a specific example of a live generation model.

FIG. 25 is a block diagram illustrating a specific example of the live generation model 71. An algorithm illustrated in FIG. 25 described below is also applied to a deep learning model technology called "Seq2Seq" as an example.

The live generation model 71 illustrated in FIG. 25 includes an encoder unit 71a and a decoder unit 71b. The encoder unit 71a and the decoder unit 71b are typically configured on the basis of a Recurrent Neural Network (RNN), but may have any configuration.

The encoder unit 71a receives the event meta information d1, compiles the event meta information d1 into vector information, and transmits the vector information to the decoder unit 71b.

The decoder unit 71b outputs the live template data d2 corresponding to the event meta information d1 on the basis of the vector information provided from the encoder unit 71a.

The live template data d2 output from the decoder unit 71b in this manner is stored in the live repository unit 22.

Issuance of Live Commentary

Figure 26:
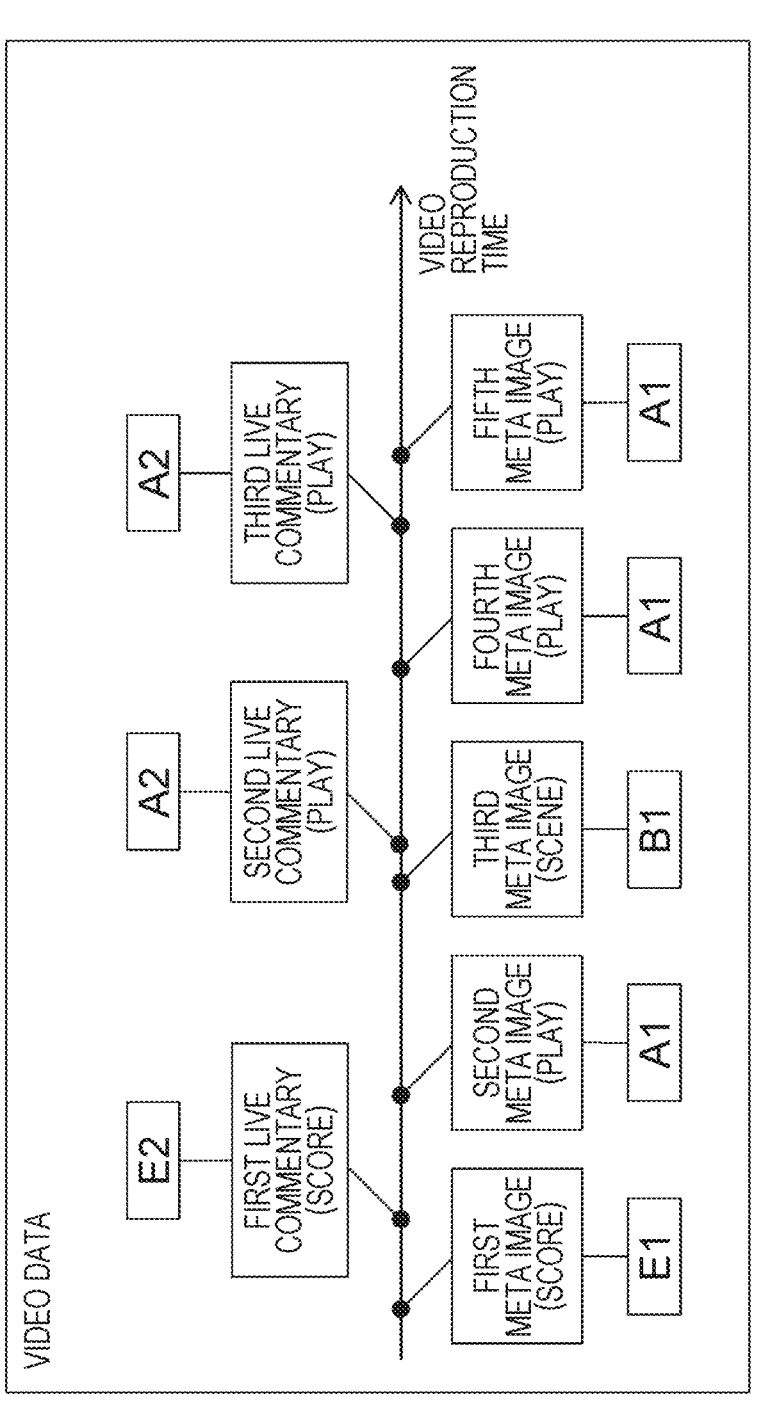
FIG. 26 is a diagram illustrating a time-series example of meta images (first to fifth meta images) and live commentary (first to third live commentaries) in video data.
Figure 27:
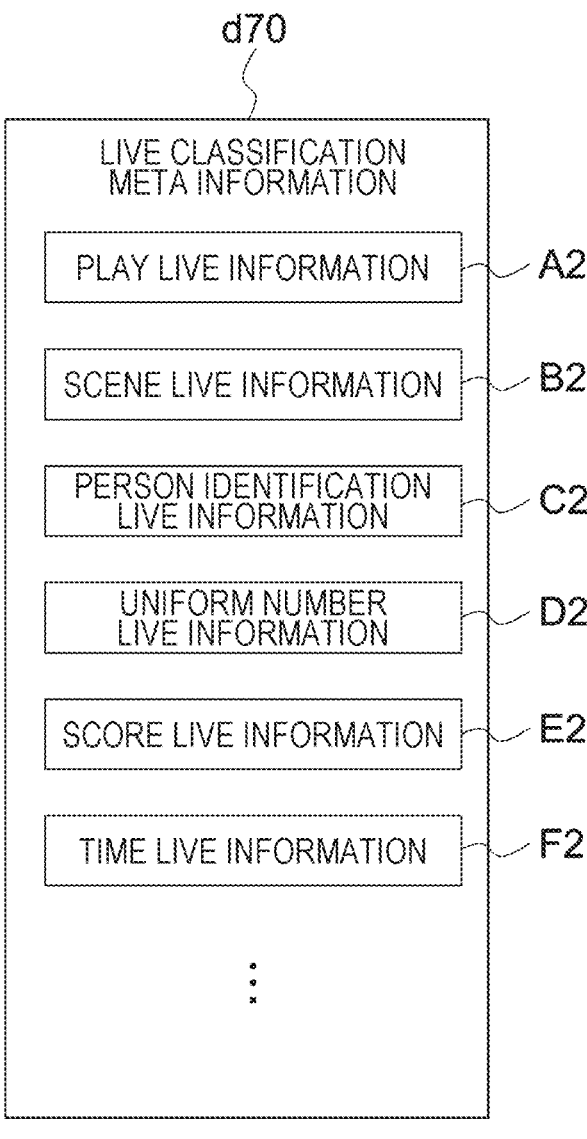
FIG. 27 is a block diagram illustrating an example of a concept of the live classification meta information.

FIG. 26 is a diagram illustrating a time-series example of meta images (first to fifth meta images) and live commentaries (first to third live commentaries) in video data. FIG. 27 is a block diagram illustrating an example of a concept of a live classification meta information d70.

In general, in an event (sports game or the like) recorded in video data, a state displayed in an image changes over time, and a live commentary corresponding to the event state is attached to the video at irregular timing. In particular, insertion timing of each live commentary is irregularly delayed from the timing of the corresponding event state. Therefore, each live commentary does not necessarily correspond to the event state at an immediately preceding timing.

In the video data illustrated in FIG. 26, a first meta image, a first live commentary, a second meta image, a third meta image, a second live commentary, a fourth meta image, a third live commentary, and a fifth meta image are reproduced in this order.

The meta-image mentioned here is a video frame cut out from the video data by the analysis unit 23 and used for acquiring the event meta information d1, and is classified according to the representative event meta information d1 to be associated.

For example, the first meta image indicates an image (score meta image) associated with score information E1 as the representative event meta information d1. The second meta image, the fourth meta image, and the fifth meta image indicate images (pre-image images) with which the play information A1 is associated as the representative event meta information d1. The third meta image indicates an image (scene meta image) associated with the scene information B1 as the representative event meta information d1.

Although not illustrated in FIG. 26, the video frame with which the person identification information C1 is representatively associated is classified as a person identification meta image, and the video frame with which the uniform number information D1 is representatively associated is classified as a uniform number meta image. In addition, a video frame with which the time information F1 is representatively associated is classified into a time meta image.

On the other hand, the live commentary is classified according to the representative live classification meta information d70 (see FIG. 27) associated with the comment content. That is, the live classification meta information d70 is meta information related to the classification of the live commentary.

The live classification meta information d70 illustrated in FIG. 27 includes a plurality of pieces of live information respectively corresponding to a plurality of pieces of information (see "play information A1" to "time information F1" illustrated in FIG. 4) included in the event meta information d1. In other words, play live information A2 corresponding to play information A1, scene live information B2 corresponding to scene information B1, person identification live information C2 corresponding to person identification information C1, and uniform number live information D2 corresponding to uniform number information D1 are included in the live classification meta information d70 illustrated in FIG. 27. In addition, score live information E2 corresponding to score information E1 and time live information F2 corresponding to time information F1 are also included in the live classification meta information d70 illustrated in FIG. 27. Note that the live classification meta information d70 may include live information (for example, "blank live information" to be described later) that does not correspond to any of the plurality of pieces of information included in the event meta information d1.

In the example illustrated in FIG. 26, the first live commentary is classified into a score live commentary having a comment content associated with the score live information E2, and is generated due to a first meta image (score meta image) associated with the score information E1. The second live commentary is classified into a play live commentary having a comment content associated with the play live information A2, and is generated due to a second meta image (play meta image) associated with the play information A1. The third live commentary is classified into a play live commentary having a comment content associated with the play live information A2, and is generated due to a fourth meta image (play meta image) associated with the play information A1.

As is clear from FIG. 26, each of the live commentary (each of the first to third commentaries) is issued delayed from the corresponding meta image (each of the first, second, and fourth meta images).

Note that, although not illustrated in FIG. 26, the live commentary with which the scene live information B2 is representatively associated is classified as a scene live commentary, and the live commentary with which the person identification live information C2 is representatively associated is classified as a person identification live commentary. The live comment representatively associated with the uniform number live information D2 is classified as the uniform number live commentary, and the live commentary representatively associated with the time live information F2 is classified as the time live commentary.

Hereinafter, the time-series information (including the history meta information d4) of the meta image and the live commentary is simply expressed using codes of the association information of the event meta information d1 and the live classification meta information d70 to be associated with each other. Therefore, the time-series reproduction information in the example illustrated in FIG. 26 is expressed as "E1, E2, A1, B1, A2, A1, A2, A1".

Figure 28:
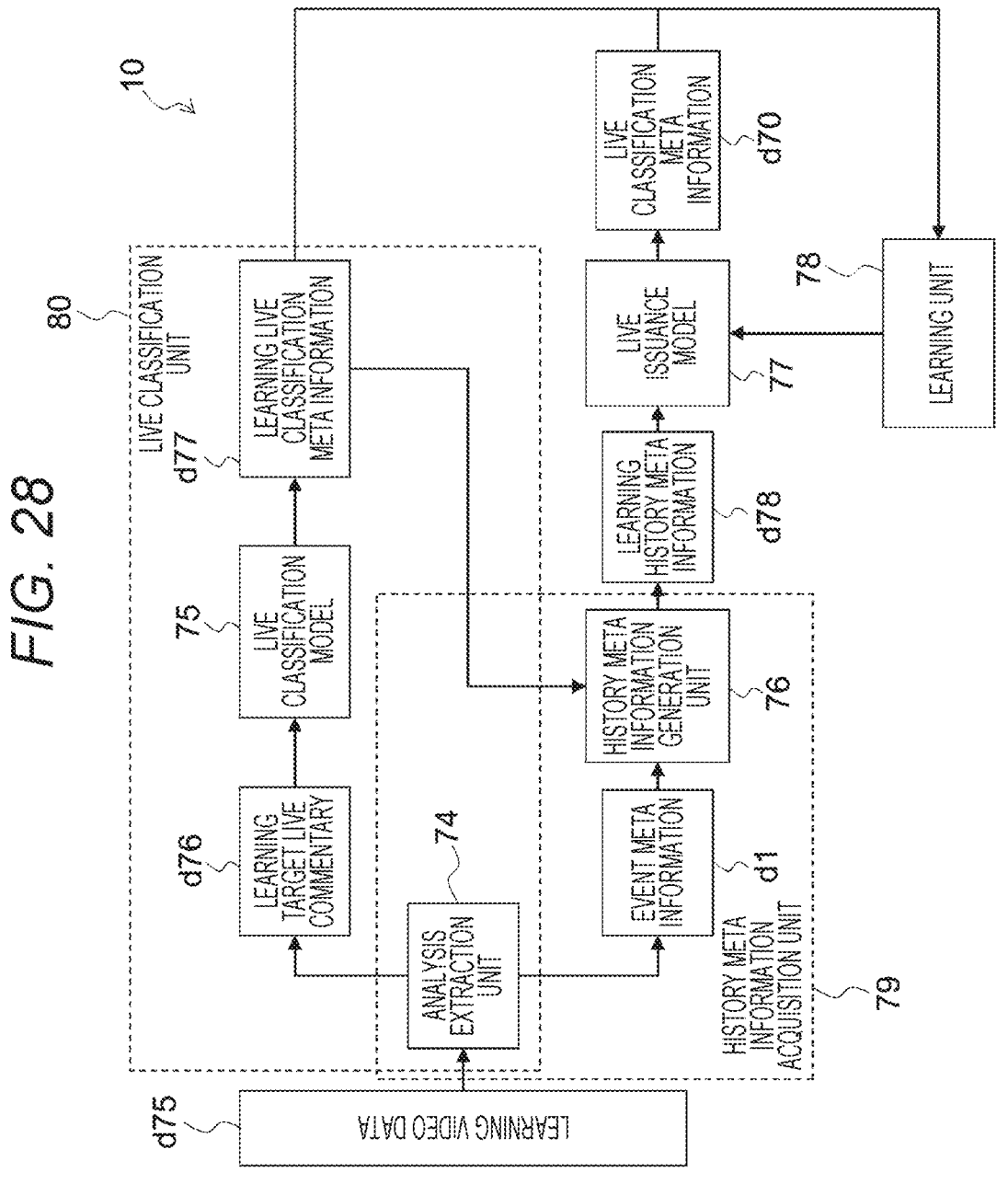
FIG. 28 is a block diagram illustrating an example of a functional configuration related to learning processing of a live issuance model.
Figure 29:
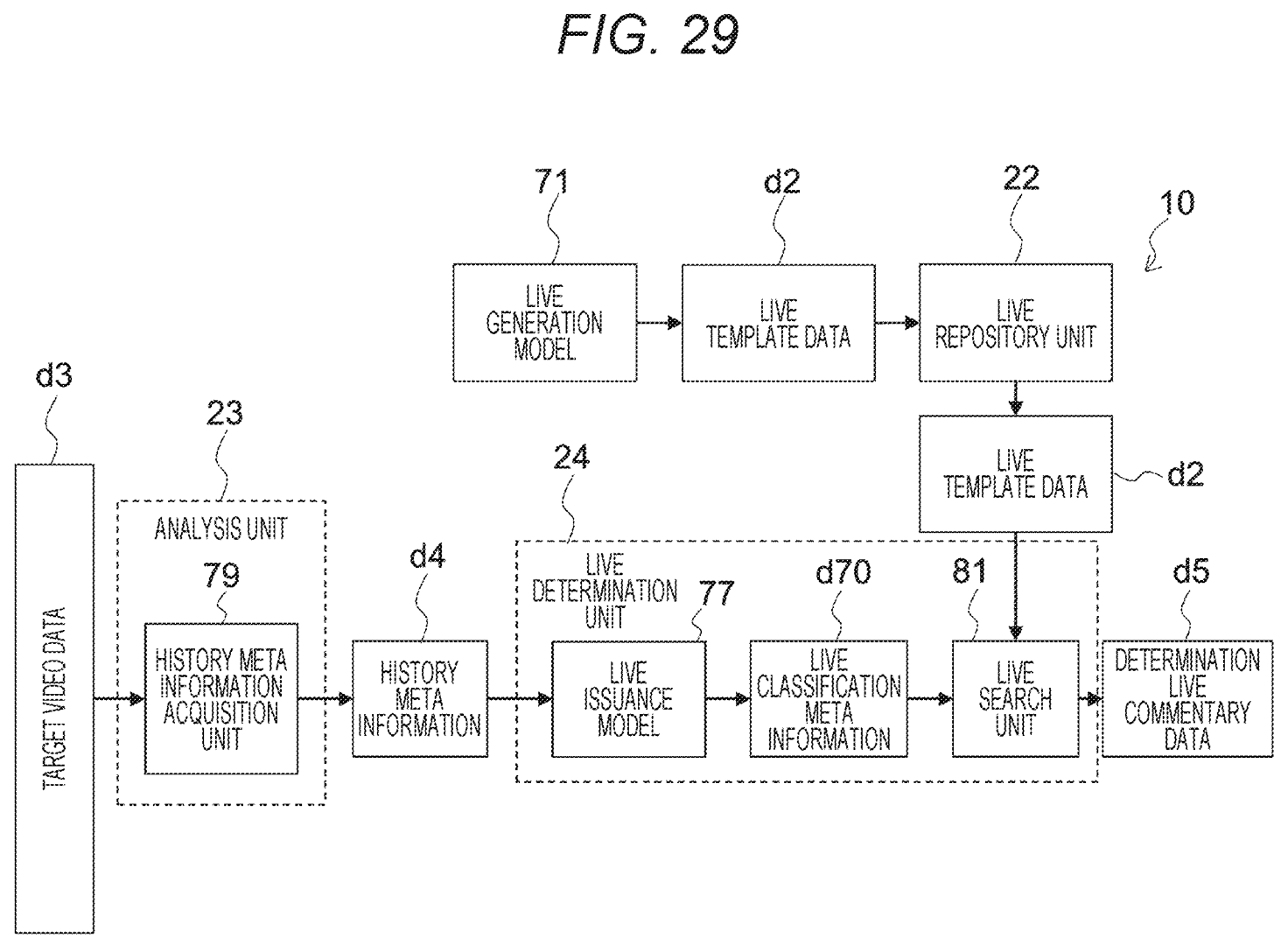

FIG. 28 is a block diagram illustrating an example of a functional configuration related to learning processing of the live issuance model 77. FIG. 29 is a block diagram illustrating an example of a functional configuration related to determination processing of a target live commentary (determination live data d79) using the live issuance model 77.

First, learning processing of a live issuance model 77 will be described.

The live issuance model 77 is a learned model learned to output a live classification meta information d78 on the basis of the learning history meta information d70. That is, the live issuance model 77 is a model that infers the live classification meta information d70 to be allocated to the next live commentary from the history meta information (event meta information d1 and live classification meta information d70) prior to the next live commentary.

Hereinafter, in order to facilitate understanding, a flow of the learning processing of the live issuance model 77 will be described on the basis of the time-series reproduction information in the example illustrated in FIG. 26. That is, a case where "E1, E2, A1, B1, A2" is the known history information, and "A1 (fourth meta image)" which is the next event meta information d1 and "A2 (third live commentary)" which is the next live classification meta information are newly acquired will be described as an example.

The comment generation device 10 illustrated in FIG. 28 includes an analysis extraction unit 74, a live classification model 75, a history meta information generation unit 76, a live issuance model 77, and a learning unit 78.

The analysis extraction unit 74 analyzes the learning video data d75, and acquires the next event meta information d1 ("A1") and the learning target live commentary d76 indicating the next live commentary ("target live commentary") from the learning video data d75.

The learning target live commentary d76 is acquired by the analysis unit 23 extracting the "target live commentary" recorded in the learning video data d75, output from the analysis unit 23, and input to the live classification model 75.

The live classification model 75 outputs the learning live classification meta information d77 ("A2") on the basis of the input learning target live commentary d76. The learning live classification meta information d77 output from the live classification model 75 in this manner is the live classification meta information d70 (see FIG. 27) corresponding to the learning target live commentary d76.

The learning live classification meta information d77 is used as teacher data in the learning processing of the live issuance model 77 as described later, and is transmitted to the history meta information generation unit 76.

On the other hand, the event meta information d1 output from the analysis extraction unit 74 is acquired by performing the analysis processing of the learning video data d75 using the learned inference model as described above, and is input to the history meta information generation unit 76.

The history meta information generation unit 76 generates and outputs the learning history meta information d78 on the basis of the event meta information d1 ("A1") input from the analysis extraction unit 74 and the learning live classification meta information d77 ("A2") input from the live classification model 75.

The learning history meta information d78 is history meta information of the learning video data d75, and is time series reproduction information of the meta images and the live commentaries. That is, the learning history meta information d78 includes the past event meta information d1 and the live classification meta information d70 associated with the event state before the time point at which the "target live commentary" is associated in the learning event.

Therefore, the learning history meta information d78 includes the event meta information d1 ("A1") input to the history meta information generation unit 76 in the current learning processing, but does not include the learning live classification meta information d77 ("A2") input to the history meta information generation unit 76 in the current learning processing. That is, the event meta information d1 obtained by the current processing and the learning history meta information d78 obtained by the previous processing are included in the learning history meta information d78 ("E1, E2, A1, B1, A2, A1") output from history meta information generation unit 76 in the current processing.

Specifically, the history meta information generation unit 76 holds "known history information ("E1, E2, A1, B1, A2")" described above, and adds the event meta information d1 ("A1") input from analysis extractor 74 to the known history information. As a result, the learning history meta information d78 ("E1, E2, A1, B1, A2, A1") output from the history meta information generation unit 76 includes "known history information ("E1, E2, A1, B1, A2")" and next event meta information d1 ("A1").

The "known history information" used in the next learning processing includes the current event meta information d1 and the current learning live classification meta information d77. That is, the history meta information generation unit 76 uses new history information ("E1, E2, A1, B1, A2, A1, A2") obtained by adding the current event meta information d1 and the current learning history meta information d78 to the current known history information as "known history information" in the next learning processing.

The live issuance model 77 is a learned model that has been learned so as to output the live classification meta information d70 on the basis of the history meta information, and can adopt any algorithm. In the present example, the learning history meta information d78 ("E1, E2, A1, B1, A2, A1") output from the history meta information generation unit 76 is input to the live issuance model 77, and the live classification meta information d70 corresponding to the learning history meta information d78 is output from the live issuance model 77.

The learning unit 78 learns the live issuance model 77 on the basis of the live classification meta information d78 output from the live issuance model 77 to which the learning history meta information d70 has been input, and the learning live classification meta information d77 ("A2") used as teacher data.

A specific learning method by the learning unit 78 is not limited. Typically, the learning unit 78 evaluates an error of the live classification meta information d70 with respect to the learning history meta information d78, and corrects the live issuance model 77 so as to minimize the error, thereby being able to learn the live issuance model 77.

As described above, the live classification unit 80 including the analysis extraction unit 74 and the live classification model 75 acquires the learning live classification meta information d77 corresponding to the learning target live commentary d76 included in the learning event recorded in the learning video data d75.

Further, the learning history meta information d78 associated with the state of the learning event before the time point with which the learning live classification meta information d77 is associated is input to the live issuance model 77 to acquire the live classification meta information d70.

Then, the learning unit 78 compares and evaluates the live classification meta information d70 obtained in this manner with the learning live classification meta information d77 used as teacher data, thereby learning the live issuance model 77. In this manner, the learned live issuance model 77 is acquired on the basis of the learning live classification meta information d77 used as teacher data and the live classification meta information d70 acquired by inputting the learning history meta information d78 to the live issuance model 77.

Next, inference processing using the live issuance model 77 will be described.

Hereinafter, in order to facilitate understanding, a flow of the inference processing of the live issuance model 77 will be described on the basis of the time-series reproduction information in the example illustrated in FIG. 26. That is, a case where "E1, E2, A1, B1, A2, A1" is the history meta information d4 and "A2 (third live commentary)" which is the next live classification meta information is newly acquired will be described as an example.

The comment generation device 10 illustrated in FIG. 29 includes a history meta information acquisition unit 79 and a live determination unit 24.

The history meta information acquisition unit 79 analyzes target video data d3 to acquire history meta information d4 ("E1, E2, A1, B1, A2, A1") associated with the target event recorded in the target video data d3. The history meta information acquisition unit 79 of this example is realized by the analysis unit 23, and specifically includes an analysis extraction unit 74 and a history meta information generation unit 76 in FIG. 28.

The live determination unit 24 acquires the target live classification meta information d70 ("A2") on the basis of the history meta information d4, and determines the target live commentary corresponding to the target live classification meta information d70. The live determination unit 24 of the present example includes a live issuance model 77 and a live search unit 81.

The live issuance model 77 receives the history meta information d4, and then acquires the live classification meta information d70 ("A2") and outputs the meta information to the live search unit 81.

The live search unit 81 determines the target live commentary from among the plurality of pieces of live template data d2 stored in the live repository unit 22, on the basis of the live template data d2 selected in accordance with the target live classification meta information d70 ("A2"). Then, the live search unit 81 outputs the determined target comment as the determination live commentary data d5.

Note that a specific method by which the live search unit 81 determines the target live commentary is not limited.

As an example, the live search unit 81 can select the live template data d2 corresponding to the target live classification meta information d70 on the basis of the related tag information.

In other words, the plurality of pieces of live template data d2 generated by the live generation model 71 as described above is stored in the live repository unit 22 in a state of being associated with the corresponding related tag information. On the other hand, the live classification meta information d70 output from the live issuance model 77 is input to the live search unit 81 in a state of being associated with the corresponding related tag information. The live search unit 81 refers to the relevant tag information associated with the live classification meta information d70, and searches for one or more pieces of live template data d2 associated with the relevant tag information from among the plurality of pieces of live template data d2 stored in the live repository unit 22. Then, the live search unit 81 determines the target live commentary on the basis of the one or more pieces of live template data d2 searched in this manner, and outputs a determination live commentary data d5.

The "related tag information" mentioned here is classification information associated with both the live template data d2 and the live classification meta information d70 as described above. The plurality of pieces of tag information included in the related tag information is not limited, but typically, tag information corresponding to the information included in the event meta information d1 is included in the related tag information. For example, in the case that event meta information d1 includes the information in FIG. 4, the related tag information may include play tag information, scene tag information, person identification tag information, uniform number tag information, score tag information, and time tag information.

Note that the live classification meta information d70 may include "blank live information" indicating that the live commentary is not attached at the target timing in the target video data d3. In a case of receiving the blank live information as the live classification meta information d70, the live search unit 81 outputs the determination live commentary data d5 that does not substantially include the live commentary. For example, in a case where the live commentary is not inserted between the temporally consecutive meta-images in the target video data d3, the live issuance model 77 outputs the blank live information as the live classification meta information d70.

Alternatively, the related tag information may include "blank tag information" indicating that no live commentary is attached. The live issuance model 77 may output the live classification meta information d70 associated with the blank tag information. In a case where the live classification meta information d70 associated with the blank tag information is input to the live search unit 81, the live search unit 81 outputs the determination live commentary data d5 that does not substantially include the live commentary.

As described above, according to the comment generation device 10 and the comment generation method of the present exemplary embodiment, the target video data d3 is analyzed by the history meta information acquisition unit 79, and the history meta information d4 associated with the target event recorded in the target video data d3 is acquired. The live determination unit 24 acquires the target live classification meta information d70 on the basis of the history meta information d4, and determines the target live commentary corresponding to the target live classification meta information d70.

This makes it possible to provide the live commentary corresponding to the state of the target event recorded in the target video analysis data d34 together with the video at an adaptive timing.

Further, the live determination unit 24 acquires the live classification meta information d70 by inputting the history meta information d4 associated with the target event to the learned live issuance model 77 learned to output a live classification meta information d70 on the basis of the history meta information d4.

This makes it possible to effectively avoid the timing of the live commentary provided together with the video from becoming monotonous.

Furthermore, the learned live issuance model 77 is obtained on the basis of the learning live classification meta information d77 corresponding to the learning target live commentary d76, and the live classification meta information d70 acquired by inputting the learning history meta information d78 to the live issuance model 77.

As a result, optimization of the live issuance model 77 is promoted, and it can be expected that the live commentary will be provided together with the video at a more appropriate timing.

The live determination unit 24 determines the target live commentary from among the plurality of pieces of live template data d2 stored in the live repository unit 22, on the basis of the live template data d2 selected in accordance with the target live classification meta information d70.

This makes it possible to provide an appropriate live commentary according to the event state together with the video.

Further, the plurality of pieces of live template data d2 are acquired by inputting the event meta information d1 to the learned live generation model 71 learned to output the plurality of pieces of live template data d2 on the basis of the event meta information d1.

This makes it possible to effectively avoid the content of the live commentary provided together with the video from becoming monotonous.

Further, the live generation model 71 can be learned by using the learning live template data extracted from the information disclosed on the network 19 according to the learning event meta information d1 as the teacher data d61.

This makes it possible to easily collect a large number of various pieces of learning live template data.

Also, the event meta information d1 includes information related to a person.

As a result, the live commentary related to the person can be provided together with the video.

Furthermore, the information associated with the person includes situation meta information estimated on a basis of motion information indicating a motion of the person obtained by analyzing the target video data d3.

This makes it possible to provide the live commentary related to the motion of the person together with the video.

Further, the situation meta information includes scene information B1 indicating the scene content of the event recorded in the target video data d3 and play information A1 indicating the play content of the event.

As a result, the live commentary related to the scene content and the play content can be provided together with the video.

Furthermore, the motion information can be based on information on a body part of a person obtained by analyzing the target video data d3.

In this case, the selection of the live commentary and the timing of the live commentary can be determined on the basis of the "information on the body part of the person" that is abstraction information of the target video data d3. With use of such abstraction information, image data (including video data) of various genres, targets, and formats can be used as learning image data (including learning video data) used for learning of the inference model.

Furthermore, the motion information can be based on information on the moving position of the person obtained by analyzing the target video data d3.

In this case, the live commentary based on the moving position of the person can be provided together with the video.

The information related to the person described above can include information for identifying a person derived from at least one of an image of appearance of the person and an image of a wearing object of the person.

In this case, information related to the person can be easily acquired, and improvement in acquisition accuracy of information related to a person can also be expected.

Also, the event meta information d1 includes information not related to a person.

As a result, the live commentary related to no person can be provided together with the video.

Furthermore, the target event recorded in the target video data d3 is a sports game, and the event meta information d1 may include at least one or more of the play information A1, the scene information B1, the person identification information C1, the score information E1, and the time information F1.

In this case, the live commentary adapted to the game can be provided together with the video of the sport game.

Furthermore, the genre of the learning event recorded in the learning video data d75 may be different from the genre of the target event recorded in the target video data d3.

In this case, the learning video data d75 can be easily obtained, and the learning processing of the live issuance model 77 can be promoted.

Furthermore, one of the target video data d3 and the learning video data d75 may be live-action video data, and the other may be generated video data.

In this case, the learning video data d75 can be easily obtained, and the learning processing of the live issuance model 77 can be promoted.

Modification

The live commentary generated by the comment generation device 10 can be provided to the user together with the corresponding video in various modes. For example, the comment generation device 10 may provide the video and audio of the target event originally recorded in the target video data d3 and the newly generated and issued live commentary to the user through separate output devices.

Figure 30:
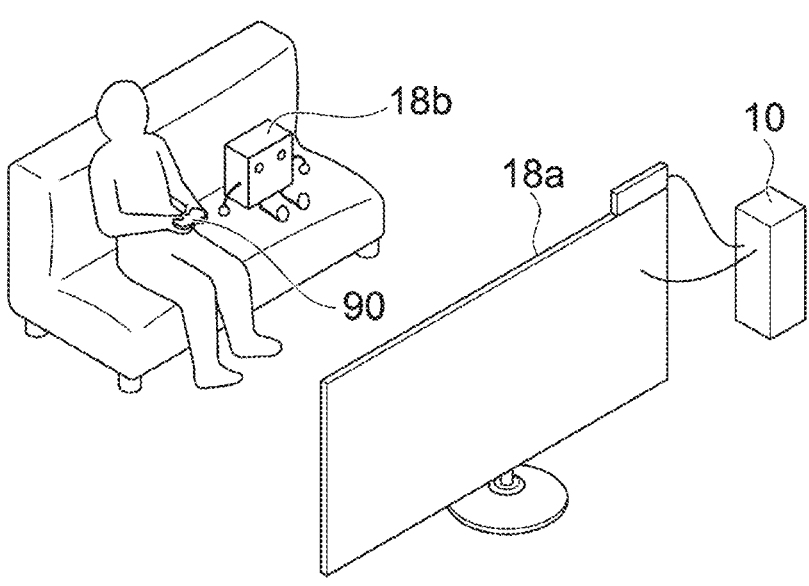
FIG. 30 is a diagram illustrating an example of an output device that outputs a target event and a live commentary.

FIG. 30 is a diagram illustrating an example of an output device that outputs a target event and a live commentary. In the example illustrated in FIG. 30, a display 18a and an AI robot (AI device) 18b are provided as output devices. The video and audio of the target event originally recorded in the target video data d3 are output through the display 18a, and the live commentary generated and issued by the comment generation device 10 is output through the AI robot 18b.

Note that a connection mode between each of the display 18a and the AI robot 18b and the comment generation device 10 is not limited, and may be a wireless connection or a wired connection. Each of the display 18a and the AI robot 18b may be connected to the comment generation device 10 through a relay device (not illustrated).

The user 90 can listen to the live commentary at an appropriate timing while communicating with the AI robot 18*b* while enjoying the video and voice of the target event through the display 18*a*. Therefore, the user 90 can instruct the AI robot 18*b* to stop and start the provision of the live commentary at an arbitrary timing, and the AI robot 18*b* can stop and start the provision of the live commentary in response to the instruction of the user 90. Furthermore, while enjoying the video and audio of the target event, the user 90 may acquire information related to the live commentary or information not related to the live commentary from the AI robot 18*b*, or instruct the AI robot 18*b* to perform arbitrary processing.

It should be noted that the embodiments and modifications disclosed in the present description are illustrative only in all respects and are not to be construed as limiting. The above-described embodiments and modifications can be omitted, replaced, and changed in various forms without departing from the scope and spirit of the appended claims. For example, the above-described embodiments and modifications may be combined in whole or in part, and other embodiments may be combined with the above-described embodiments or modifications. Furthermore, the effects of the present disclosure described in the present description are merely exemplification, and other effects may be provided.

A technical category embodying the above technical idea is not limited. For example, the above-described technical idea may be embodied by a computer program for causing a computer to execute one or a plurality of procedures (steps) included in a method of manufacturing or using the above-described device. Furthermore, the above-described technical idea may be embodied by a computer-readable non-transitory recording medium in which such a computer program is recorded.

SUPPLEMENTARY NOTE

The present disclosure can also have the following configurations.

Item 1

A comment generation device including:
a history meta information acquisition unit configured to analyze target video data and acquire history meta information associated with a target event recorded in the target video data; and
a live determination unit configured to acquire target live classification meta information on a basis of the history meta information, and determine a target live commentary corresponding to the target live classification meta information, in which
the history meta information includes past event meta information and live classification meta information associated with an event state before a time point with which the target live commentary is associated in the target event, and
the event meta information is meta information associated with a state of the target event, and
the live classification meta information is meta information associated with classification of the live commentary.

Item 2

The comment generation device according to item 1, in which the live determination unit acquires the target live classification meta information by inputting the history meta information associated with the target event to a learned live issuance model learned to output a live classification meta information on a basis of the history meta information.

Item 3

The comment generation device according to item 2, in which the learned live issuance model is obtained on a basis of learning live classification meta information corresponding to a learning target live commentary included in the learning event recorded in the learning video data; and
the live classification meta information acquired by inputting, to a live issuance model, learning history meta information associated with an event state before a time point at which the learning target live commentary is associated in the learning event.

Item 4

The comment generation device according to item 2 or 3, further including:
a live classification unit configured to analyze learning video data to acquire learning live classification meta information corresponding to a learning target live commentary included in a learning event recorded in the learning video data; and
a learning unit configured to learn the live issuance model on a basis of the learning live classification meta information used as teacher data and the live classification meta information acquired by inputting, to the live issuance model, learning history meta information associated with an event state before a time point at which the learning target live commentary is associated in the learning event.

Item 5

The comment generation device according to any one of Items 1 to 4, in which the live determination unit determines the target live commentary on a basis of live template data selected from among a plurality of pieces of live template data stored in a repository unit in accordance with the target live classification meta information.

Item 6

The comment generation device according to item 5, in which the plurality of pieces of live template data is acquired by inputting the event meta information to a learned live generation model learned to output a plurality of pieces of live template data on a basis of the event meta information.

Item 7

The comment generation device according to Item 6, further including a learning unit that performs learning of the live generation model by using, as teacher data, learning live template data extracted from information disclosed on a network according to the event meta information.

Item 8

The comment generation device according to any one of items 1 to 7, in which the event meta information includes information associated with a person.

Item 9

The comment generation device according to item 8, in which the information associated with the person includes situation meta information estimated on a basis of motion information indicating a motion of the person obtained by analyzing the target video data.

Item 10

The comment generation device according to item 9, in which the situation meta information includes at least one of scene information indicating a scene content of an event and play information indicating a play content of the event.

Item 11

The comment generation device according to item 9 or 10, in which the motion information is based on information on a body part of the person obtained by analyzing the target video data.

Item 12

The comment generation device according to any one of items 9 to 11, in which the motion information is based on information on a moving position of the person obtained by analyzing the target video data.

Item 13

The comment generation device according to any one of items 8 to 12, in which the information associated with the person includes information for identifying the person derived from at least one of an image of appearance of the person and an image of attachment of the person.

Item 14

The comment generation device according to any one of items 1 to 13, in which the event meta information includes information not associated with the person.

Item 15

The comment generation device according to any one of items 1 to 14, in which the target event is a sports game, and the event meta information includes at least one of scene information regarding a scene content of the game, play information regarding a play content of the game, person identification information regarding a participant of the game, score information regarding a score of the game, and time information regarding a time of the game.

Item 16

The comment generation device according to any one of items 3 to 15, in which a genre of the learning event is different from a genre of the target event.

Item 17

The comment generation device according to any one of items 3 to 16, in which one of the target video data and the learning video data is live-action video data, and the other is generated video data.

Item 18

A comment generation method including the steps of:

analyzing target video data and acquiring history meta information associated with a target event recorded in the target video data; and acquiring target live classification meta information on a basis of the history meta information, and determining a target live commentary corresponding to the target live classification meta information, in which the history meta information includes past event meta information and live classification meta information associated with an event state before a time point with which the target live commentary is associated in the target event, and the event meta information is meta information associated with a state of the target event, and the live classification meta information is meta information associated with classification of the live commentary.

Item 19

A program for causing a computer to implement:

analyzing target video data and acquiring history meta information associated with a target event recorded in the target video data; and acquiring target live classification meta information on a basis of the history meta information, and determining a target live commentary corresponding to the target live classification meta information, in which the history meta information includes past event meta information and live classification meta information associated with an event state before a time point with which the target live commentary is associated in the target event, and the event meta information is meta information associated with a state of the target event, and the live classification meta information is meta information associated with classification of the live commentary.

REFERENCE SIGNS LIST

10 Comment generation device
11 CPU
12 GPU
13 RAM
14 Storage
15 Network I/F
16 Bus
17 Input device
18 Output device
18a Display
18b AI robot
19 Network
21 Live generation unit
22 Live repository unit
23 Analysis unit
24 Live determination unit
25 Output unit

31 Frame cutout unit
32 Feature information acquisition unit
33 Play inference model
34 Learning unit
37 Video classification unit
38 Low frame rate analysis unit
39 High frame rate analysis unit
41 Frame cutout unit
42 Feature information acquisition unit
43 Scene inference model
44 Learning unit
47 Face inference model
47a Convolutional neural network
47b Convolutional neural network
47c Neural network
48 Learning unit
49 Frame cutout unit
50 Face image detection unit
53 Uniform number inference model
54 Learning unit
55 Frame cutout unit
56 Uniform number image detection unit
57 Person estimation unit
60 Score inference model
61 Learning unit
62 Time inference model
63 Learning unit
64 Frame cutout unit
65 Score image detection unit
66 Frame cutout unit
67 Time image detection unit
71 Live generation model
71a Encoder unit
71b Decoder unit
72 Learning unit
74 Analysis extraction unit
75 Live classification model
76 History meta information generation unit
77 Live issuance model
78 Learning unit
79 History meta information acquisition unit
80 Live classification unit
81 Live search unit
90 User
A1 Play information
B1 Scene information
C1 Person identification information
D1 Uniform number information
E1 Score information
F1 Time information
A2 Play live information
B2 Scene live information
C2 Person identification live information
D2 Uniform number live information
E2 Score live information
F2 Time live information
d1 Event meta information
d2 live template data
d3 Target video data
d4 History meta information
d5 Determination live commentary data
d21 Learning video data
d22 Learning video analysis data
d23 Teacher data
d24 Target video analysis data
d25 Low frame rate data
d26 High frame rate data d27 Play space information
d28 Play time information
d31 Learning video data
d32 Learning video analysis data
d33 Teacher data
d34 Target video analysis data
d38 Learning face image data
d39 Teacher data
d40 Target face image data
d42 Learning uniform number image data
d43 Teacher data
d44 Target uniform number image data
d47 Learning score image data
d48 Teacher data
d49 Learning time image data
d50 Teacher data
d51 Target score image data
d52 Target time image data
d61 Teacher data
d70 Live classification meta information
d75 Learning video data
d76 Learning target live commentary
d77 Learning live classification meta information
d78 Learning history meta information
d79 Determination live data

The invention claimed is:

1. A comment generation device, comprising:
circuitry configured to:
   analyze target video data;
   acquire history meta information associated with a target event recorded in the target video data, wherein meta information associated with a state of the target event corresponds to event meta information;
   acquire target live classification meta information based on the history meta information; and
   determine a target live commentary corresponding to the target live classification meta information, wherein
   meta information associated with classification of the target live commentary corresponds to live classification meta information,
   the history meta information includes past event meta information and past live classification meta information,
   the past event meta information corresponds to the event meta information associated with a first event state before a first time point with which the target live commentary is associated in the target event, and
   the past live classification meta information corresponds to the event meta information associated with the first event state before the first time point with which the target live commentary is associated in the target event.

2. The comment generation device according to claim 1, further comprising
a live issuance model configured to:
   learn based on the history meta information associated with the target event; and
   output the live classification meta information based on the history meta information, wherein
the circuitry is further configured to:
   input the history meta information associated with the target event to a learned live issuance model, wherein the learned live issuance model is the live issuance model that has learned to output the live classification meta information based on the history meta information; and acquire the target live classification meta information based on the inputted history meta information associated with the target event.

3. The comment generation device according to claim 2, wherein the circuitry is further configured to input learning history meta information to the live issuance model, wherein the learning history meta information is associated with a second event state before a second time point at which a learning target live commentary is associated in a learning event recorded in a learning video data; and acquire the live classification meta information based on the inputted learning history meta information, and the learned live issuance model is obtained based on learning live classification meta information corresponding to the learning target live commentary included in the learning event recorded in the learning video data, and the acquired live classification meta information.

4. The comment generation device according to claim 2, wherein the circuitry is further configured to:

analyze learning video data;

acquire learning live classification meta information based on the analyzed learning video data, wherein the learning live classification meta information corresponds to a learning target live commentary included in a learning event recorded in the learning video data;

input learning history meta information to the live issuance model, wherein the learning history meta information is associated with a second event state before a second time point at which the learning target live commentary is associated in the learning event;

acquire the live classification meta information based on the inputted learning history meta information; and learn the live issuance model based on the learning live classification meta information used as teacher data, and the acquired live classification meta information.

5. The comment generation device according to claim 1, wherein the circuitry is further configured to:

store a plurality of pieces of live template data; and determine the target live commentary based on a live template data selected from the plurality of pieces of live template data, wherein the live template data is selected based on the target live classification meta information.

6. The comment generation device according to claim 5, wherein the circuitry is further configured to:

input the event meta information to a live generation model, wherein the live generation model is learned to output the plurality of pieces of live template data based on the event meta information; and acquire the plurality of pieces of live template data based on the inputted event meta information.

7. The comment generation device according to claim 6, wherein the circuitry is further configured to perform learning of the live generation model based on learning live template data as teacher data, wherein the learning live template data is extracted from information disclosed on a network, and the learning live template data is extracted based on the event meta information.

8. The comment generation device according to claim 1, wherein the event meta information includes information associated with a person.

9. The comment generation device according to claim 8, wherein the circuitry is further configured to:

analyze the target video data;

estimate motion information based on the analyzed target video data; and estimate situation meta information based on the motion information, wherein the motion information indicates a motion of the person, and the information associated with the person includes the situation meta information estimated based on the motion information.

10. The comment generation device according to claim 9, wherein the situation meta information includes at least one of scene information indicating a scene content of an event or play information indicating a play content of the event.

11. The comment generation device according to claim 9, wherein the circuitry is further configured to:

obtain information on a body part of the person based on the analyzed target video data; and estimate the motion information based on the obtained information on the body part of the person.

12. The comment generation device according to claim 9, wherein the circuitry is further configured to:

obtain information on a moving position of the person based on the analyzed target video data; and estimate the motion information based on the obtained information on the moving position of the person.

13. The comment generation device according to claim 8, wherein the information associated with the person includes information for identification of the person, and the information for the identification of the person is based on at least one of an image of appearance of the person or an image of attachment of the person.

14. The comment generation device according to claim 1, wherein the event meta information includes information unrelated to a person.

15. The comment generation device according to claim 1, wherein the target event is a sports game, and the event meta information includes at least one of scene information regarding a scene content of the sports game, play information regarding a play content of the sports game, person identification information regarding a participant of the sports game, score information regarding a score of the sports game, or time information regarding a time of the sports game.

16. The comment generation device according to claim 3, wherein a genre of the learning event is different from a genre of the target event.

17. The comment generation device according to claim 3, wherein one of the target video data or the learning video data is live-action video data, and a remaining one of the target video data or the learning video data is generated video data.

18. A comment generation method, comprising:

analyzing target video data;

acquiring history meta information associated with a target event recorded in the target video data, wherein meta information associated with a state of the target event corresponds to event meta information;

acquiring target live classification meta information based on the history meta information; and determining a target live commentary corresponding to the target live classification meta information, wherein meta information associated with classification of the target live commentary corresponds to live classification meta information, the history meta information includes past event meta information and past live classification meta information, the past event meta information corresponds to the event meta information associated with an event state before a time point with which the target live commentary is associated in the target event, and the past live classification meta information corresponds to the event meta information associated with the event state before the time point with which the target live commentary is associated in the target event.

19. A non-transitory computer-readable medium having stored thereon computer-executable instructions that, when executed by a computer, cause the computer to execute operations, the operations comprising:

analyzing target video data;

acquiring history meta information associated with a target event recorded in the target video data, wherein meta information associated with a state of the target event corresponds to event meta information;

acquiring target live classification meta information based on the history meta information; and determining a target live commentary corresponding to the target live classification meta information, wherein meta information associated with classification of the target live commentary corresponds to live classification meta information, the history meta information includes past event meta information and past live classification meta information, the past event meta information corresponds to the event meta information associated with an event state before a time point with which the target live commentary is associated in the target event, and the past live classification meta information corresponds to the event meta information associated with the event state before the time point with which the target live commentary is associated in the target event.

* * * * *